(12) United States Patent
Kameoka et al.

(10) Patent No.: US 10,569,629 B2
(45) Date of Patent: Feb. 25, 2020

(54) GLASS RUN FOR AUTOMOBILE DOOR

(71) Applicant: NISHIKAWA RUBBER CO., LTD., Hiroshima (JP)

(72) Inventors: Taisuke Kameoka, Hiroshima (JP); Shinichiro Emori, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 155 days.

(21) Appl. No.: 15/472,059

(22) Filed: Mar. 28, 2017

(65) Prior Publication Data

US 2017/0291480 A1 Oct. 12, 2017

(30) Foreign Application Priority Data

Apr. 12, 2016 (JP) .................................. 2016-079650
Dec. 27, 2016 (JP) .................................. 2016-252670

(51) Int. Cl.
*B60J 10/76* (2016.01)
*B60J 10/50* (2016.01)

(52) U.S. Cl.
CPC .............. *B60J 10/76* (2016.02); *B60J 10/50* (2016.02)

(58) Field of Classification Search
CPC . B60J 10/21; B60J 10/74; B60J 10/265; B60J 10/76; B60J 10/30; B60J 10/79; B60J 10/32; B60J 10/50; B60J 10/26
See application file for complete search history.

(56) References Cited

U.S. PATENT DOCUMENTS

| | | | | |
|---|---|---|---|---|
| 4,894,289 A | * | 1/1990 | Otawa | B32B 25/08 428/424.2 |
| 5,414,961 A | * | 5/1995 | Tessier | B60J 10/16 49/441 |
| 6,131,342 A | * | 10/2000 | Miyamoto | B60J 10/24 49/484.1 |
| 6,493,992 B2 | * | 12/2002 | Goto | B60J 10/79 49/441 |
| 7,410,203 B2 | * | 8/2008 | Yatsuda | B60J 10/30 296/146.1 |
| 7,487,615 B2 | * | 2/2009 | Watanabe | B60J 10/74 49/428 |
| 7,571,569 B2 | * | 8/2009 | Hiramatsu | B60J 10/21 49/441 |
| 7,581,354 B2 | * | 9/2009 | Yamada | B60J 10/21 49/440 |

(Continued)

FOREIGN PATENT DOCUMENTS

| | | |
|---|---|---|
| JP | 2009-012601 A | 1/2009 |
| JP | 2012-076504 A | 4/2012 |

*Primary Examiner* — Justin B Rephann
(74) *Attorney, Agent, or Firm* — Renner, Otto, Boisselle & Sklar, LLP

(57) ABSTRACT

Disclosed is a glass run for an automobile door which may block noise that has passed through a door glass from easily reaching the passenger's ears, while reducing an increase in the weight and cost of the glass run. In the glass run, a space R is formed between a base end portion 41b of an inner seal lip 41 located inside a cabin and an inner surface 22b of a door glass 22 facing inside the cabin. A facing surface 41d of the inner seal lip 41 facing the inner surface 22b of the door glass 22 is provided with a sound absorbing portion 41h which absorbs noise that has entered the inside of the cabin through the door glass 22.

3 Claims, 17 Drawing Sheets

(56) References Cited

U.S. PATENT DOCUMENTS

| | | | |
|---|---|---|---|
| 7,650,718 B2 * | 1/2010 | Eguchi | B60J 1/08 49/440 |
| 8,051,606 B2 * | 11/2011 | Maaβ | B60J 10/74 49/479.1 |
| 8,104,229 B2 * | 1/2012 | Minami | B60J 10/277 49/441 |
| 8,479,449 B2 * | 7/2013 | Titz | B60J 10/78 49/440 |
| 8,869,456 B2 * | 10/2014 | Matsuura | E06B 7/22 49/489.1 |
| 9,643,478 B2 * | 5/2017 | Kanasugi | B60J 10/76 |
| 9,649,921 B2 * | 5/2017 | Bessho | B60J 5/0402 |
| 9,694,660 B2 * | 7/2017 | Kameoka | B60J 10/50 |
| 9,718,337 B2 * | 8/2017 | Stephan | B60J 10/76 |
| 2001/0001917 A1 * | 5/2001 | Goto | B60J 10/79 49/440 |
| 2005/0072053 A1 * | 4/2005 | Filipczak | B60J 10/79 49/490.1 |
| 2005/0166459 A1 * | 8/2005 | Watanabe | B60J 10/74 49/415 |
| 2005/0188622 A1 * | 9/2005 | Nestell | B60J 1/10 49/441 |
| 2005/0229496 A1 * | 10/2005 | Tashima | B60J 10/78 49/441 |
| 2006/0021281 A1 * | 2/2006 | Tamaoki | B60J 10/265 49/441 |
| 2007/0006534 A1 * | 1/2007 | Hiramatsu | B60J 10/21 49/414 |
| 2007/0251152 A1 * | 11/2007 | Takase | B60J 10/74 49/441 |
| 2009/0021044 A1 * | 1/2009 | Maab | B60J 10/21 296/146.2 |
| 2009/0108625 A1 * | 4/2009 | Minami | B60J 10/277 296/146.2 |
| 2010/0077670 A1 * | 4/2010 | Jimenez | B60J 10/88 49/479.1 |
| 2012/0079772 A1 | 4/2012 | Mine | |
| 2013/0111821 A1 * | 5/2013 | Suzuki | B60J 10/78 49/483.1 |
| 2013/0305612 A1 * | 11/2013 | Murree | E06B 7/2314 49/483.1 |
| 2014/0033614 A1 * | 2/2014 | Bartolomucci | B60J 10/18 49/506 |
| 2015/0130214 A1 * | 5/2015 | Im | B60J 5/0402 296/146.2 |
| 2016/0129772 A1 * | 5/2016 | Kanasugi | B60J 10/76 49/504 |
| 2016/0214471 A1 * | 7/2016 | Bessho | B60J 5/0402 |
| 2016/0355075 A1 * | 12/2016 | Kameoka | B60J 10/50 |

* cited by examiner

GLASS RUN FOR AUTOMOBILE DOOR

CROSS-REFERENCE TO RELATED APPLICATION

This application claims priority to Japanese Patent Application No. 2016-079650 filed on Apr. 12, 2016, and Japanese Patent Application No. 2016-252670 filed on Dec. 27, 2016, the entire disclosure of which is incorporated by reference herein.

BACKGROUND

The present disclosure relates to a glass run for an automobile or any other vehicle, particularly to a structure which absorbs noise that has entered a cabin through a door glass.

In general, a side door of an automobile includes a door glass which is movable up and down, a door frame extending along an edge of the door glass which has moved up to an upper position, and a glass run which seals a gap between the door frame and the door glass (see, for example, Japanese Unexamined Patent Application No. 2012-76504 and Japanese Unexamined Patent Application No. 2009-12601). The glass run is attached to the door frame, and includes an inner seal lip (located inside a cabin) which, when attached to the door frame, comes into contact with an inner surface (a surface facing inside a cabin) of the door glass in the upper position. The inner seal lip includes a base end portion integrally molded with a body of the glass run, and a free tip end portion. Thus, when the inner surface of the door glass comes into contact with the inner seal lip, the inner seal lip is elastically deformed to come into close contact with the inner surface of the door glass.

SUMMARY

Noise generated outside the cabin enters the cabin through a door glass. As technologies have reduced noise from an engine and a driving system and enhanced sound insulating properties of an interior material, noise coming from the outside to inside of the cabin through the door glass is becoming another problem to be solved. In most vehicles, a head of a passenger seated in the cabin is located close to the inner surface of the door glass, with his or her ears facing the inner surface of the door glass, and the noise that has entered the cabin through the door glass easily reaches the passenger's ears. Thus, the problem mentioned above becomes more pronounced.

Further, in a state where the tip end portion of the inner seal lip of the glass run is in contact with the inner surface of the door glass, the base end portion of the inner seal lip is separated from the inner surface of the door glass, and a small space is formed between the base end portion of the inner seal lip and the inner surface of the door glass. Noise that has passed through the door glass enters this space. Since the "noise" comes from various directions, sound enters the door glass in various different incident directions. In some cases, noise that has passed through the door glass may possibly go toward a surface of the base end portion of the inner seal lip. The sound that has come to the surface of the base end of the inner seal lip is reflected from that surface and travels toward the inner surface of the door glass. Part of the sound then passes through the door glass to go outside the cabin, while the other part of the sound is reflected from the inner surface of the door glass, and reflected again from the surface of the base end portion of the inner seal lip. The present inventors have discovered that such repeated reflection of sound causes amplification (reflection amplification) of the sound in the above-described space, and the sound may easily reach the passenger's ears.

To solve the problem of noise, for example, the door glass may be made of a pair glass, or a film with high sound insulating properties may be sandwiched between glasses so as to radically reduce the noise penetration. However, such techniques are not recommended because they result in increase in the weight and cost of the door glass.

In view of the foregoing, it is therefore an object of the present disclosure to provide a glass run which blocks noise that has passed through a door glass from easily reaching the passenger's ears, with almost no significant increase in the weight and cost of the glass run.

To achieve the object, a first aspect of the present disclosure is directed to a glass run for an automobile door, the glass run being attached to a door frame extending along an edge of a door glass, and made of an elastic material which seals a gap between the door glass and the door frame.

The glass run includes a glass run body attached to the door flame, and an inner seal lip extending from an inner portion of the glass run body located inside a cabin toward an inner surface of the door glass facing inside the cabin, and including a tip end portion configured to come into contact with the inner surface of the door glass, the inner seal lip includes a base end portion separated from the inner surface of the door glass toward the inside of the cabin, the base end portion of the inner seal lip and the inner surface of the door glass forming a gap therebetween, and a facing surface of the inner seal lip facing the inner surface of the door glass is provided with a sound absorbing portion which absorbs noise that has entered the cabin through the door glass.

According to this configuration, the tip end portion of the inner seal lip of the glass run comes into contact with the inner surface of the door glass to seal a gap between the door glass and the door frame. In this sealed state, the base end portion of the inner seal lip is separated from the inner surface of the door glass toward the inside of the cabin, and a space is formed between the base end portion of the inner seal lip and the inner surface of the door glass. Noise that has entered the cabin through the door glass includes a component which may pass through the space and reach the facing surface of the inner seal lip facing the inner surface of the door glass. The facing surface is provided with the sound absorbing portion, which absorbs the noise component that has reached the facing surface. As a result, reflection amplification of the noise does not occur easily in the space.

A second aspect of the present disclosure is an embodiment of the first aspect of the present disclosure. According to the second aspect, an angle formed between the facing surface of the inner seal lip and the inner surface of the door glass is set to 35 degrees or more and 65 degrees or less.

According to this configuration, the angle formed between the facing surface of the base end portion of the inner seal lip facing the inner surface of the door glass and the inner surface of the door glass is 35 degrees or more. Thus, noise that has entered the space through the door glass is reflected fewer times in the space, and thus, is less prone to be amplified. Moreover, the angle formed between the facing surface facing the inner surface of the door glass and the inner surface of the door glass is 65 degrees or less. This may reduce the risk of a decrease in amount of sound reflected from the base end portion of the inner seal lip and goes out of the cabin through the door glass. That is, setting of the angle α in the above-described manner and provision of the sound absorbing portion synergistically reduce the noise, thereby further reducing the sound pressure of noise that reaches the passenger's ears.

In addition, since the angle formed between the facing surface facing the inner surface of the door glass and the inner surface of the door glass is 35 degrees or more, a sound component itself which obliquely passes through the door glass to enter the facing surface decreases, and the door glass increases a transmission loss due to the so-called coincidence effect. This may also reduce the sound pressure of the noise that reaches the passenger's ears.

A third aspect of the present disclosure is an embodiment of the first aspect of the present disclosure. According to the third aspect, the facing surface of the inner seal lip is a curved surface which bulges toward the inner surface of the door glass, and if tangent lines are drawn at points constituting a curve representing the curved surface shown in a cross section of the inner seal lip cut along a direction from the tip end portion to the base end portion, and angles formed between the respective tangent lines and the inner surface of the door glass are measured to obtain an angular range, a median of the angular range is set to 35 degrees or more and 65 degrees or less.

According to this configuration, if the facing surface of the base end portion of the inner seal lip facing the inner surface of the door glass is a curved surface, the facing surface and the sound absorbing portion may provide the synergistic advantages, just like the second aspect of the present disclosure.

A fourth aspect of the present disclosure is an embodiment of the first aspect of the present disclosure. According to the fourth aspect, the inner seal lip includes a glass contact surface on which the door glass slides when moving up or down, and the sound absorbing portion is not formed on the glass contact surface.

According to this configuration, the sound absorbing portion is not formed on the glass contact surface of the inner seal lip. This may prevent damage and/or wear of the sound absorbing portion caused by the door glass if the door glass slides on the sound absorbing portion. Consequently, the sound absorbing portion is allowed to absorb sound effectively for a long time.

The sound absorbing portion may be comprised of a rough surface or a bristled portion. According to the present disclosure, the door glass does not slide on the rough surface or the bristled portion, which may reduce the generation of noise.

A fifth aspect of the present disclosure is directed to a glass run for an automobile door, the glass run being attached to a door frame extending along an edge of a door glass, and made of an elastic material which seals a gap between the door glass and the door frame.

The glass run comprises a glass run body attached to the door flame, and an inner seal lip extending from an inner portion of the glass run body located inside a cabin toward an inner surface of the door glass facing inside the cabin, and including a tip end portion configured to come into contact with the inner surface of the door glass, a sound barrier is provided at least for an end, or around an end, of an inner wall portion of the glass run, and a portion of the sound barrier facing the cabin is provided with a sound absorbing portion which absorbs noise that has entered the cabin through the door glass.

According to this configuration, the tip end portion of the inner seal lip of the glass run comes into contact with the inner surface of the door glass to seal a gap between the door glass and the door frame. In this sealed state, the sound barrier may block noise, which has entered a small space between the base end portion of the inner seal lip and the inner surface of the door glass through the door glass, and reflection-amplified in that space, from being released toward the inside of the cabin and reaching the passenger.

Further, noise that has entered the cabin through the door glass includes a component which may reach a portion of the sound barrier facing the cabin. The portion of the sound barrier facing the cabin is provided with the sound absorbing portion, which absorbs the noise component that has reached the sound barrier.

A sixth aspect of the present disclosure is an embodiment of the fifth aspect of the present disclosure. According to the sixth aspect, a gap is provided between the sound barrier and the inner surface of the door glass.

According to this configuration, the gap formed between the sound barrier and the inner surface of the door glass does not allow the sound absorbing portion of the sound barrier to come into contact with the inner surface of the door glass. This may prevent damage and/or wear of the sound absorbing portion caused by the door glass if the door glass slides on the sound absorbing portion. Consequently, the sound absorbing portion is allowed to absorb sound effectively for a long time. If the sound barrier were in contact with the door glass, the oscillation of the door glass would vary depending on the contact position of the sound barrier, which might affect the sound pressure level of the transmitted noise, or increase the sound pressure level of the transmitted noise in a certain frequency band. According to the present disclosure, however, such a phenomenon may substantially be prevented.

In addition, the sound absorbing portion may be comprised of a rough surface or a bristled portion. According to the present disclosure, the door glass does not slide on the rough surface or the bristled portion, which may prevent the generation of noise.

According to the first aspect of the present disclosure, the sound absorbing portion is provided on the facing surface of the inner seal lip facing the inner surface of the door glass. The sound absorbing portion absorbs noise that has entered the cabin through the door glass and reached the facing surface. As a result, reflection amplification of the noise does not occur easily in the space. Thus, such a simple configuration, in which the sound absorbing portion is provided on the inner seal lip of the glass run, may reduce the sound pressure of noise that reaches the passenger's ears, while reducing an increase in the weight and cost of the glass run.

According to the second aspect of the present disclosure, the angle formed between the facing surface of the inner seal lip and the inner surface of the door glass is set to 35 degrees or more and 65 degrees or less. Setting of the angle in this manner and provision of the sound absorbing portion for the facing surface synergistically reduce the noise, thereby further reducing the sound pressure of noise that reaches the passenger's ears. This may improve quietness in the cabin.

According to the third aspect of the present disclosure, if the facing surface of the inner seal lip is a curved surface which bulges toward the inner surface of the door glass, the sound pressure of noise that reaches the passenger's ears may further be reduced, thereby improving the quietness in the cabin.

According to the fourth aspect of the present disclosure, the sound absorbing portion is not formed on the glass contact surface of the inner seal lip. This may prevent damage and/or wear of the sound absorbing portion, and maintain effective sound absorption by the sound absorbing portion for a long time. In addition, if the sound absorbing portion is comprised of a rough surface of a bristled portion, the generation of noise may be reduced.

According to the fifth aspect of the present disclosure, the sound barrier provided at least for an end, or around an end, of the inner wall portion of the glass run may block noise, which is reflection-amplified in a small space between the base end portion of the inner seal lip and the inner surface of the door glass, from being released toward the inside of the cabin. In addition, the sound absorbing portion is formed on a portion of the sound barrier facing the cabin. Such a simple configuration may reduce the sound pressure of noise that reaches the passenger's ears, while reducing an increase in the weight and cost of the glass run.

According to the sixth aspect of the present disclosure, the door glass does not slide on the sound absorbing portion of the sound barrier. This may prevent damage and/or wear of the sound absorbing portion, and maintain effective sound absorption by the sound absorbing portion for a long time. Further, if the sound absorbing portion is comprised of a rough surface or a bristled portion, the generation of noise may be reduced. Moreover, if the sound barrier were in contact with the door glass, the oscillation of the door glass would vary depending on the contact position of the sound barrier, which might affect the sound pressure level of the transmitted noise, or increase the sound pressure level of the transmitted noise in a certain frequency band. According to the present disclosure, however, such a phenomenon may substantially be prevented.

DETAILED DESCRIPTION

Embodiments of the present disclosure will be described in detail with reference to the drawings. The embodiments to be described below are merely exemplary ones in nature, and do not intend to limit the scope of the present invention or application or uses thereof.

First Embodiment

Figure 1:
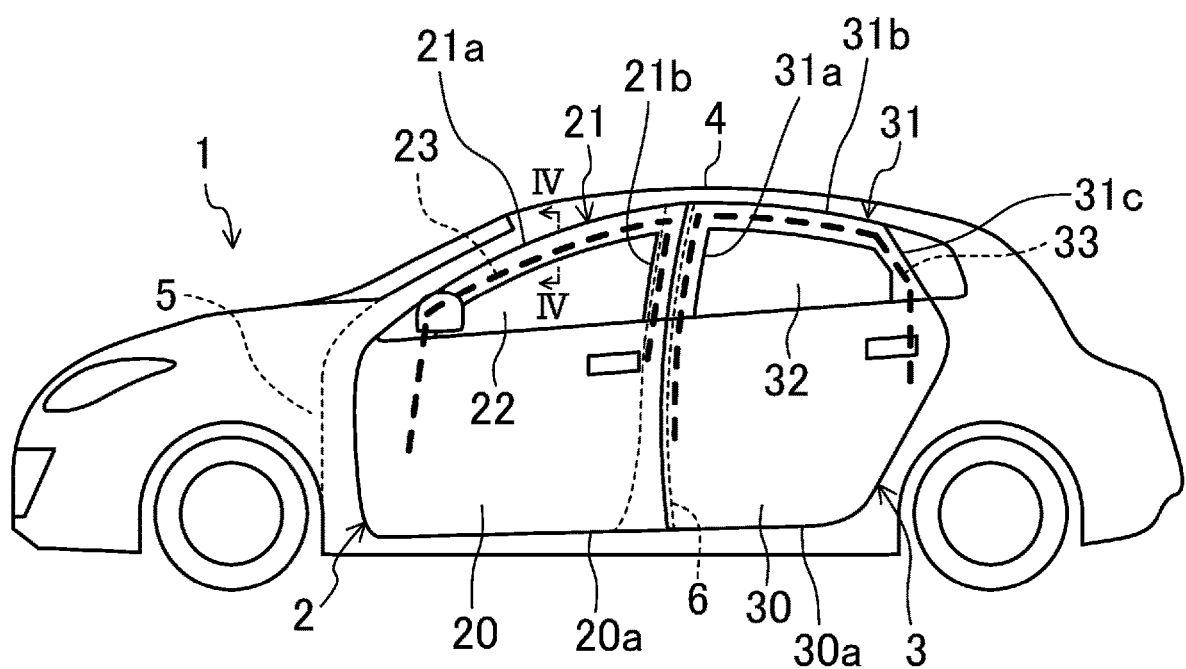
FIG. 1 is a left side view illustrating an automobile including a glass run according to an embodiment.

FIG. 1 is a left side view illustrating an automobile 1 including glass runs 23, 33 according to an embodiment of the present disclosure. The automobile 1 includes a front door 2 and a rear door 3 on respective sides. However, the present disclosure is also applicable to an automobile with no rear door 3. Further, in addition to automobiles, the present disclosure may be applicable to various kinds of vehicles in a cabin of which noise may enter from outside. However, in particular, the present disclosure is suitably applied to a passenger car. In the following description of the embodiments, front and rear sides of a vehicle may simply be referred to as the "front," and the "rear," respectively.
(Configuration for Front Door and Rear Door)

Figure 2:
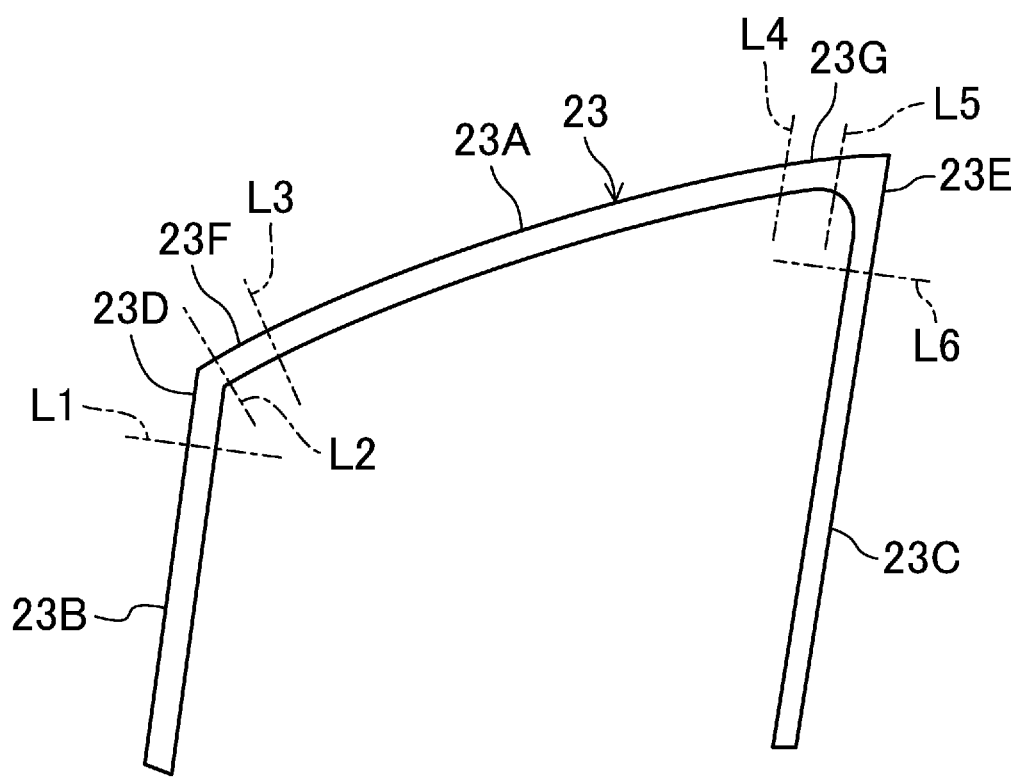
FIG. 2 is a left side view illustrating a glass run for a left front door.

The front door 2 includes a door body 20 comprising almost lower half of the front door 2, a door frame 21 comprising almost upper half of the front door 2, a front door glass 22, and a glass run 23 for the front door (also shown in FIG. 2). The door body 20 is a hollow body comprised of an outer panel 20a and an inner panel (not shown), and a front end thereof is attached to an A pillar (front pillar) 5 of the automobile 1 via hinges (not shown).

A window regulator (not shown) which allows the front door glass 22 to move up and down is arranged in the door body 20. When moved down to a lower position, the front door glass 22 is housed in the hollow door body 20. When the front door glass 22 has moved up to an upper position, and an edge of the front door glass 22 is supported by the door frame 21 via the glass run 23. The door frame 21 protrudes upward from the top of the door body 20, extends along the edge of the front door glass 22, and includes an upper frame portion 21a and a vertical frame portion 21b. The upper frame portion 21a is curved as a whole along an upper edge of the front door glass 22 to extend obliquely upward toward the rear side. This upper frame portion 21a extends along a front half of a roof 4 of the automobile 1 when viewed from the side. Further, the vertical frame portion 21b extends vertically along a rear edge of the front door glass 22.

Figure 3:
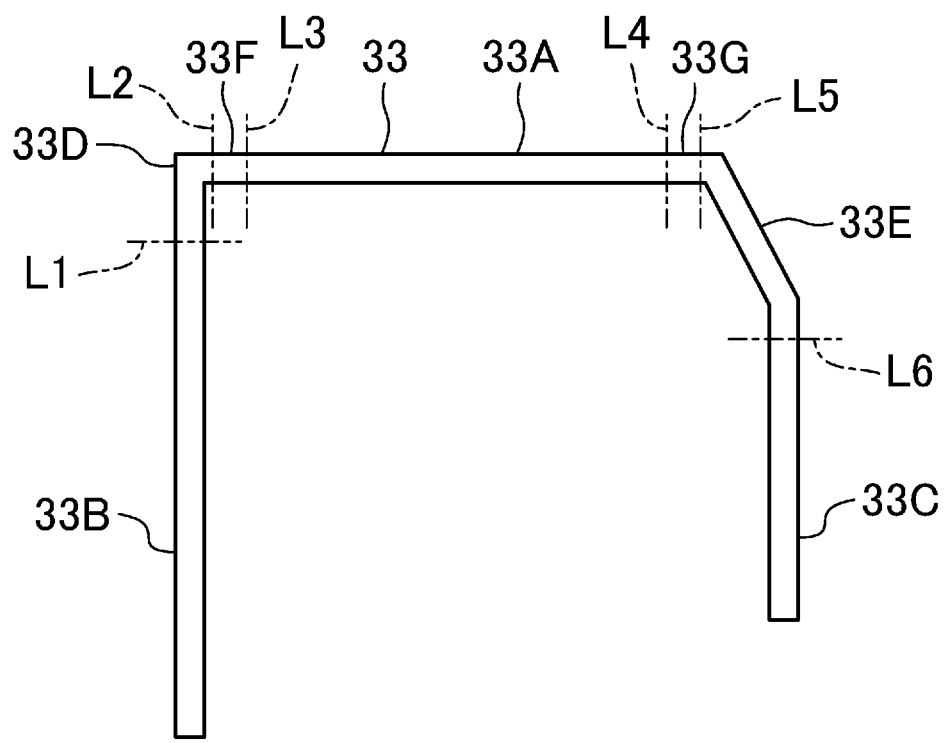
FIG. 3 is a left side view illustrating a glass run for a left rear door.

The rear door 3 has basically the same structure as the front door 2, and includes a door body 30 comprised of an outer panel 30a and an inner panel (not shown), a door frame 31, a rear door glass 32 which is movable up and down, and a glass run 33 for the rear door (also shown in FIG. 3). The door body 30 is attached to a B pillar (center pillar) 6 of the automobile 1 via hinges (not shown). When the rear door glass 32 has moved up to an upper position, an edge thereof is supported by the door frame 31 via the glass run 33. The door frame 31 extends along the edge of the rear door glass 32, and includes a front vertical frame portion 31a, an upper frame portion 31b, and a rear vertical frame portion 31c. The front vertical frame portion 31a extends along a front edge of the rear door glass 32. The upper frame portion 31b extends along an upper edge of the rear door glass 32. The upper frame portion 31b extends along a rear half of the roof 4 of the automobile 1 when viewed from the side. Further, the rear vertical frame portion 31c extends along a rear edge of the rear door glass 32.

The front and rear doors 2 and 3 may be sliding doors which slide in a lengthwise direction of the automobile 1.
(Configuration for Door Frame)

The door frame 21 of the front door 2 and the door frame 31 of the rear door 3 have substantially the same structure, although their appearances are different from each other. Thus, the door frame 21 of the front door 2 will be described in detail below.

Figure 4:
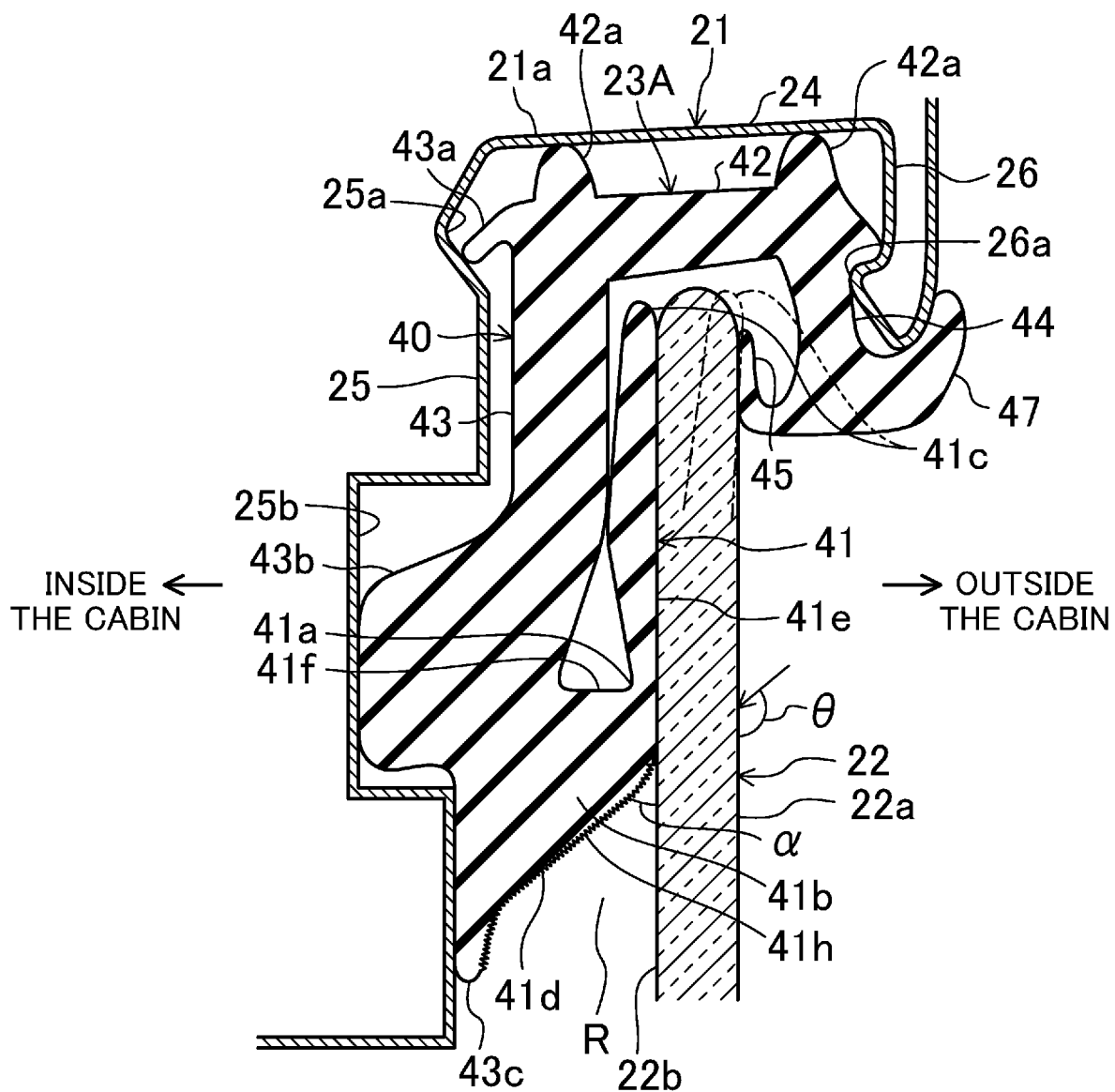
FIG. 4 is a cross-sectional view taken along the plane IV-IV shown in FIG. 1.

As shown in FIG. 4, the door frame 21 is made of a molded metallic plate, and may be obtained by any method, e.g., by roll-forming a single plate, or combining a plurality of press-molded plates. The upper frame portion 21a of the door frame 21 has a substantially C-shaped cross section which is open downward as a whole, and includes a bottom portion 24, an inner side portion 25 (a side portion located inside the cabin) extending downward from an inner end (an end located inside the cabin) of the bottom portion 24, and an outer side portion 26 (a side portion located outside the cabin) extending downward from an outer end (an end located outside the cabin) of the bottom portion 24. A small recess 25a which is depressed toward the inside of the cabin is formed at an end of the inner side portion 25 closer to the bottom portion 24. In addition, a large recess 25b which is depressed toward the inside of the cabin is formed in the inner side portion 25 at a level lower than the small recess 25a. The large recess 25b is deeper than the small recess 25a. A tip end of the outer side portion 26 is provided with a protrusion 26a protruding toward the inside of the cabin.

Although not shown, the vertical frame portion 21b of the door frame 21 has a substantially C-shaped cross section which is open forward. Just like the upper frame portion 21a, the vertical frame portion 21b includes a bottom portion, an inner side portion, and an outer side portion.
(Configuration for Glass Run)

As shown in FIGS. 1 and 2, the glass run 23 for the front door includes an upper glass run 23A extending along the upper frame portion 21a of the door frame 21, i.e., extending along the front half of the roof 4 of the automobile 1 in the lengthwise direction, a front vertical glass run 23B vertically extending along the A pillar 5 of the automobile 1, a rear vertical glass run 23C vertically extending along the B pillar 6 of the automobile 1, a front corner glass run 23D bent at a boundary between the upper glass run 23A and the front vertical glass run 23B, and a rear corner glass run 23E bent at a boundary between the upper glass run 23A and the rear vertical glass run 23C. Specifically, the front vertical glass run 23B extends downward from a boundary line L1. The front corner glass run 23D lies between the boundary line L1 and a boundary line L3. The upper glass run 23A lies between the boundary line L3 and a boundary line L4. The rear corner glass run 23E lies between the boundary line L4 and a boundary line L6. The rear vertical glass run 23C extends downward from the boundary line L6.

The upper glass run 23A, the front vertical glass run 23B, the rear vertical glass run 23C, the front corner glass run 23D, and the rear corner glass run 23E are made of an elastic material capable of sealing a gap between the door glass 22 and the door frame 21, for example, a thermoplastic elastomer such as a styrene-based thermoplastic elastomer (TPS) and an olefin-based thermoplastic elastomer (TPO), and various kinds of rubber, and are obtained by integrally molding the elastic material. The elastic material may be a foamed material, a non-foamed solid material, or a fine-foamed solid material. As will be described later, only a portion which is required to be undeformed may suitably be made of a solid or fine-foamed solid material.

As shown in FIG. 4, the upper glass run 23A includes a glass run body 40 inserted in, and attached to, the upper frame portion 21a of the door frame 21, the inner seal lip 41 located inside the cabin, and an outer seal lip 45 located outside the cabin. The outer seal lip 45 is configured to come into contact with an outer surface 22a of the front door glass 22 facing the outside of the cabin.

The glass run body 40 includes a bottom wall portion 42, an inner wall portion 43 located inside the cabin, and an outer wall portion 44 located outside the cabin, and thus, has a substantially C-shaped cross-section which is open downward. Protrusions 42a, 42a protrude upward from an upper surface of the bottom wall portion 42, and are spaced from each other in a widthwise direction of the automobile 1. The protrusions 42a, 42a are in contact with the bottom portion 24 of the upper frame portion 21a.

The outer wall portion 44 includes the outer seal lip 45. The outer seal lip 45 extends upward from an end of the outer wall portion 44. The outer wall portion 44 further includes a cover 47 which covers the outer side portion 26 of the upper frame portion 21a of the door frame 21 from below.

A small tab 43a protrudes from an upper end of an inner surface (a surface facing the inside of the cabin) of the inner wall portion 43 toward the inside of the cabin. The small tab 43a enters the small recess 25a of the inner side portion 25 so as to abut, and engage with, an inner surface of the small recess 25a.

A protrusion 43b protrudes from the inner surface of the inner wall portion 43 toward the inside of the cabin at a level lower than the small tab 43a. The protrusion 43b enters the large recess 25b of the inner side portion 25, and abuts, and engages with, an inner surface of the large recess 25b.

The inner seal lip 41 is integrally molded with a lower end of the inner wall portion 43. The inner seal lip 41 extends from the lower end of the inner wall portion 43 toward an inner surface 22b (a surface facing the inside of the cabin) of the front door glass 22, and has a tip end configured to come into contact with the inner surface 22b of the front door glass 22. Specifically, in a state where the front door glass 22 has moved down, the inner seal lip 41 protrudes obliquely upward from the lower end of the inner wall portion 43 as partially indicated by a phantom line in FIG. 4. The inner seal lip 41 has, in a middle portion thereof in the protruding direction, a depression 41a which facilitates the bending and deformation of the inner seal lip 41. A portion of the inner seal lip 41 provided with the depression 41a is thinner than the other portion. Regarding the depression 41a as a boundary, a portion closer to the base end of the inner seal lip 41 is referred to as a base end portion 41b, and a portion closer to the tip end of the inner seal lip 41 is referred to as a tip end portion 41c.

When the front door glass 22 has moved up (fully closed), an outer surface (a surface facing the outside of the cabin) of the tip end portion 41c comes into contact with the inner surface 22b of the front door glass 22. That is, the outer surface of the tip end portion 41c of the inner seal lip 41 serves as a glass contact surface 41e on which the front door glass 22 slides when moving up or down. The glass contact surface 41e is treated to be relatively hard so as to reduce a frictional resistance between the front door glass 22 moving up or down and the glass contact surface 41e. Further, the glass contact surface 41e is a smooth surface with no projections and depressions, and thus allows easy reflection of sound.

In a state where the front door glass 22 has moved up to an upper position, an outer surface (a surface facing the outside of the cabin) of the base end portion 41b of the inner seal lip 41 serves as a facing surface 41d which faces the inner surface 22b of the front door glass 22. The facing surface 41d of the base end portion 41b of the inner seal lip 41 is a surface into which noise that has entered the cabin through the front door glass 22 (transmitted sound) enters, and is separated away from the inner surface 22b of the front door glass 22 by a predetermined distance. According to this configuration, a space R is formed between the base end portion 41b of the inner seal lip 41 and the inner surface 22b of the front door glass 22. The facing surface 41d is inclined as a whole such that a lower portion thereof is located at a larger distance from the inner surface 22b of the front door glass 22. Thus, a dimension of the space R in a widthwise direction of the automobile gradually increases downward.

In this embodiment, an angle α formed between the facing surface 41d of the base end portion 41b of the inner seal lip 41 and the inner surface 22b of the front door glass 22 is set to 35 degrees or more and 65 degrees or less. The angle α is easily changeable by changing a head of an extruder used for extrusion-molding the base end portion 41b of the inner seal lip 41, or changing the shape of a molding die used to mold the base end portion 41b. The setting of the angle α does not cost very much, involving almost no increase in weight.

The facing surface 41d does not need to be strictly flat, and may be curved with an extremely low curvature as long as the facing surface 41d is approximately flat.

The facing surface 41d includes a sound absorbing portion 41h which absorbs noise that has entered the cabin through the front door glass 22. In FIG. 4, a fine wavy line indicates the range of the sound absorbing portion 41h. The sound absorbing portion 41h reflects less noise than the glass contact surface 41e, and absorbs more noise than the glass contact surface 41e. Thus, the sound absorbing portion 41h is able to attenuate the noise.

Figure 7:
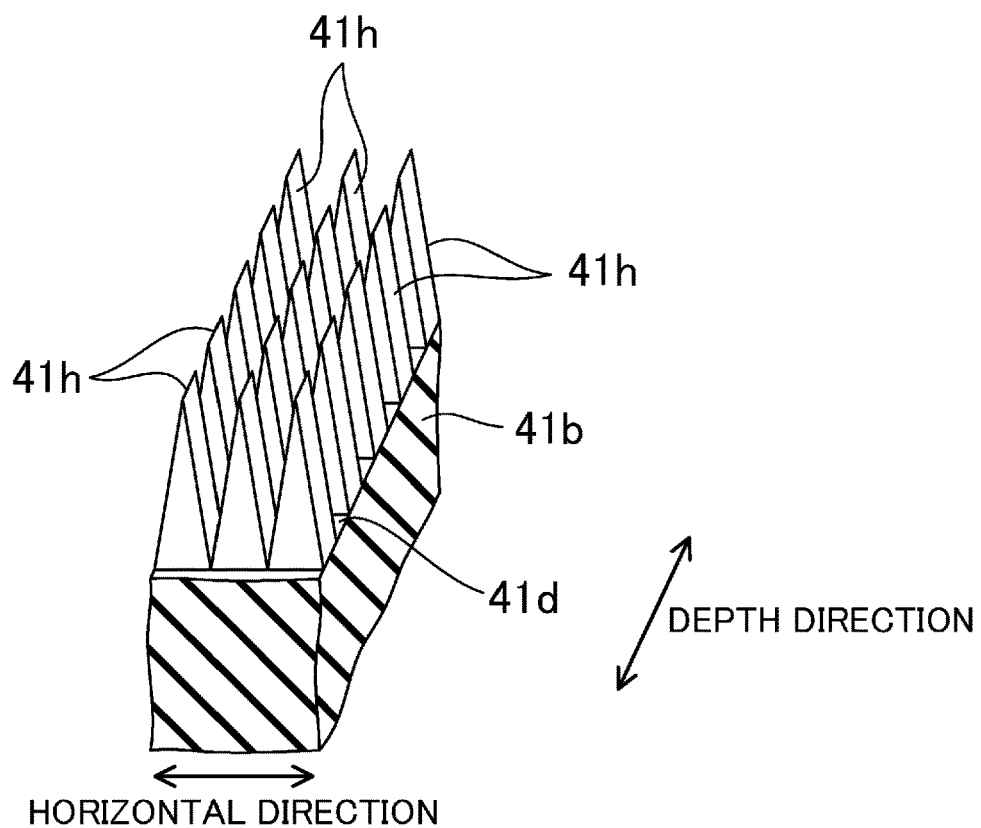
FIG. 7 is an enlarged cross-sectional view illustrating part of the sound absorbing portion.

More specifically, the sound absorbing portion 41h may be comprised of, for example, a plurality of protrusions 41h protruding from the facing surface 41d as shown in an enlarged view of FIG. 7. Each of the protrusions 41h is pointed toward its tip end in the protruding direction. Further, a gap is suitably formed between adjacent protrusions 41h, 41h. In the configuration shown in FIG. 7, a gap is formed between the base ends of the protrusions 41h, 41h adjacent to each other in a depth direction, while no gap is formed between the base ends of the protrusions 41h, 41h adjacent to each other in a horizontal direction. Note that the horizontal and depth directions in FIG. 7 are shown for the explanation purpose only, and are irrelevant to the directions related to the automobile.

The shape of the protrusion 41h is not limited to the one shown in FIG. 7. For example, the protrusion 41h may have the shape of a column, a pyramid, a cone, a plate, or a pin. The number (density) of the protrusions 41h per unit area may be determined as needed. That is, the shape and density of the protrusions 41h may be determined such that the protrusions 41h more effectively absorb the noise that has entered the cabin. Changing the shape and density of the protrusions 41h may allow the protrusions 41h to actively absorb the noise in a frequency band which is easily sensed by the passenger. Further, the shape and density of the protrusion 41h may be varied within the facing surface 41d. For example, some of the protrusions 41h in a lower portion of the facing surface 41d may be formed at a higher density, or with a greater height, than the protrusions 41h in an upper portion of the facing surface 41.

Although not shown, the sound absorbing portion 41h may be comprised of recesses. The recesses may be dimples, or grooves, for example. Alternatively, the sound absorbing portion 41h may be comprised of a grained surface. If the grained surface is adopted, the depth of the grain may be uniform, or non-uniform.

The facing surface 41d may be cut, or partially burned by applying laser light thereon, to form the protrusions 41h or the recesses. If the laser light is applied to the facing surface 41d, the height of the protrusions 41h or the depth of the recesses may freely be changed, or the pattern of the protrusions 41h or recesses may be changed, by adjusting the scanning rate and/or output of the laser light.

Figure 9:
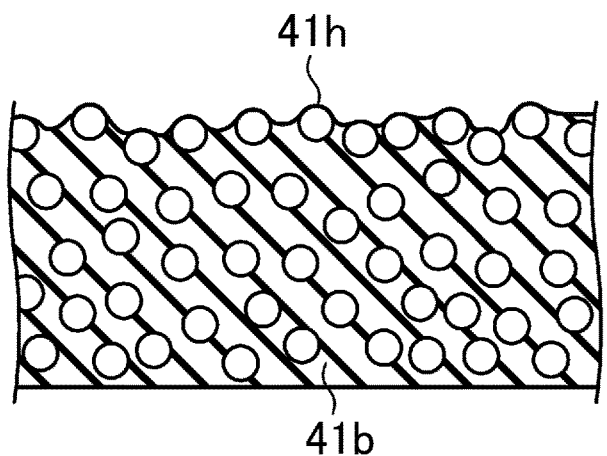
FIG. 9 is an enlarged cross-sectional view illustrating a sound absorbing portion according to an alternative example.

The sound absorbing portion 41h may be comprised of a rough surface shown in FIG. 9. In this example, the base end portion 41b of the inner seal lip 41 is made of a foamed material, and bubbles in the foamed material appear on the surface (facing surface) to obtain the sound absorbing portion 41h comprised of a rough surface. The size and density of the bubbles may be adjusted by a known method, e.g., by selecting a suitable foaming agent and/or changing foaming conditions. Adjusting the size and density of the bubbles allows the depth of depressions and the height of projections to be set freely.

Although not shown, if the base end portion 41b of the inner seal lip 41 is made of a foamed material, the bubbles in the foamed material are allowed to open on the facing surface 41d so that the bubbles themselves function as the sound absorbing portion 41h.

The sound absorbing portion 41h may be a bristled portion obtained by fixing a plurality of bristles thereto. The bristled portion may be made of a bristle tape with a plurality of bristles fixed thereto. The sound absorbing portion 41h may be made of fibers such as fabrics.

Alternatively, the sound absorbing portion 41h may be comprised of a combination of optionally selected two or more of the above-described protrusions, recesses, rough surface, bristled portion, fibers, and bubbles. The sound absorbing portion 41h may be formed with almost no increase in weight.

In this embodiment, as indicated by the wavy line in FIG. 4, the sound absorbing portion 41h is formed only in the range of the facing surface 41d, and is not formed on the glass contact surface 41e of the tip end portion 41c of the inner seal lip 41. According to this configuration, the glass contact surface 41e has no sound absorbing portion 41h. Thus, the inner surface 22b of the front door glass 22 does not come into contact with the sound absorbing portion 41h. Note that the sound absorbing portion 41h may be formed also in the range of the glass contact surface 41e. However, the glass contact surface 41e is suitably smooth and flat to reduce a frictional resistance between the glass contact surface 41e and the front door glass 22.

Further, the inner wall portion 43 includes an abutting portion 43c which abuts the inner side portion 25 of the upper frame portion 21a of the door frame 21. The abutting portion 43c is located under the inner seal lip 41. Thus, the inner wall portion 43 is supported by the inner side portion 25 with at least the protrusion 43b and the abutting portion 43c abutting the inner side portion 25, and thus, is stably attached to the upper frame portion 21a. In particular, a portion between the protrusion 43b and the abutting portion 43c is stabilized, and the base end portion 41b of the inner seal lip 41, which is located at the stabilized portion, is also stabilized. This may eventually reduce the range of variation of the angle α when an external force is applied to the inner wall portion 43.

The base end portion 41b of the inner seal lip 41 further includes a thick portion 41f integrated with the inner wall portion 43. According to this configuration, the deformation of the base end portion 41b may be reduced while ensuring significant deformation of the tip end portion 41c of the inner seal lip 41. This may reduce the range of variation of the angle α when an external force is applied to the inner wall portion 43.

The base end portion 41b and thick portion 41f of the inner seal lip 41 are suitably made of a solid material with no bubbles, or a fine-foamed solid material except for the sound absorbing portion 41h if the sound absorbing portion 41h is comprised of bubbles. Further, a portion of the inner wall portion 43 at a lower level than the thick portion 41f is suitably made of a solid material, or a fine-foamed solid material except for the sound absorbing portion 41h if the sound absorbing portion 41h is comprised of bubbles. This may reduce the range of variation of the angle α when an external force is applied to the inner wall portion 43. The rest of the inner wall portion 43 is suitably made of a foamed material for the purpose of weight reduction.

The above-described setting of the angle α formed between the facing surface 41d of the base end portion 41b of the inner seal lip 41 and the inner surface 22b of the front door glass 22 may hold good only for the upper glass run 23A. The angle α may deviate from the above-described range in the front vertical glass run 23B, the rear vertical glass run 23C, the front corner glass run 23D and the rear corner glass run 23E. Further, as shown in FIG. 2, suppose that the front corner glass run 23D has an upper portion 23F ranging from the boundary between the front corner glass run 23D and the upper glass run 23A to a point where the inner seal lip 41 starts to bend, i.e., a portion between the boundary lines L2 and L3, and likewise, the rear corner glass run 23E has an upper portion 23G between the boundary lines L4 and L5. In this case, the above-described setting of the angle α between the facing surface 41d of the base end portion 41b of the inner seal lip 41 and the inner surface 22b of the front door glass 22 may hold good only for the upper glass run 23A and the upper portions 23F and 23G. The angle α may deviate from the above-described range in the front vertical glass run 23B, the rear vertical glass run 23C, and portions of the front and rear corner glass runs 23D and 23E other than the upper portions 23F and 23G.

Figure 5:
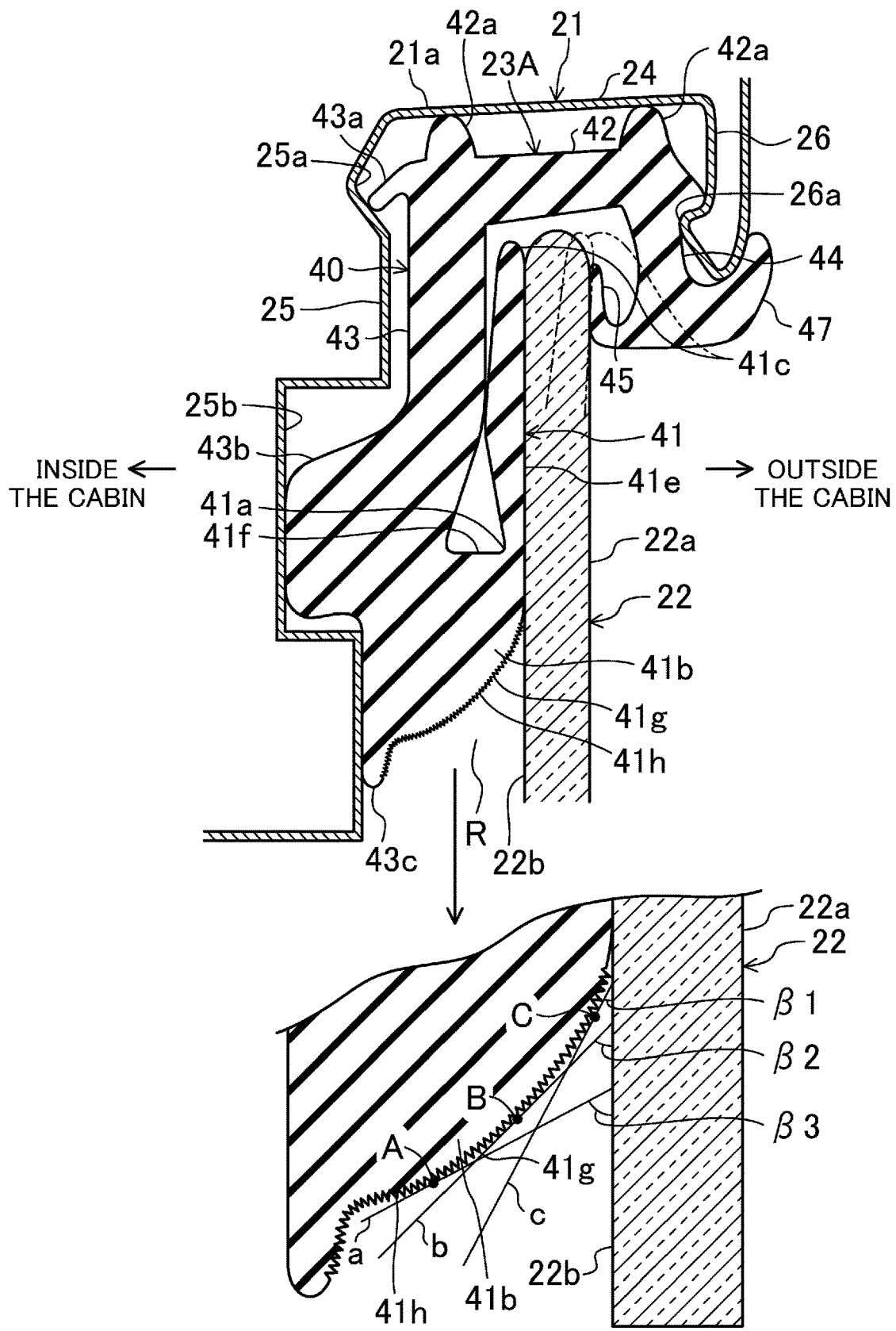
FIG. 5 is a view corresponding to FIG. 4, illustrating an alternative example.

Moreover, as an alternative example shown in FIG. 5, a surface (facing surface) of the base end portion 41b of the inner seal lip 41 facing the inner surface 22b of the front door glass 22 may be a curved surface 41g which bulges toward the inner surface 22b. The curved surface 41g has a low curvature, and is almost flat. The sound absorbing portion 41h is formed on the curved surface 41g.

In this alternative example, if the inner seal lip 41 is viewed in a cross section taken along the direction from the tip end portion to the based end portion (as shown in FIG. 5), a curve representing the curved surface 41g appears on the cross section as shown in an enlarged view in a lower portion of FIG. 5. Tangent lines (a, b, c, . . . ) to the curve are drawn at points (A, B, C, . . . ) constituting this curve as shown in FIG. 5. Although FIG. 5 shows only three tangent lines for the convenience's sake, more tangent lines can be drawn if a distance between the points is shortened. Then, provided that the tangent line c and the inner surface 22b of the front door glass 22 form an angle β1, the tangent line b and the inner surface 22b of the front door glass 22 form an angle β2, and the tangent line a and the inner surface 22b of the front door glass 22 form an angle β3, a range including the angles β1, β2, and β3 (angular range) is obtained. A median of the angular range is set to 35 degrees or more and 65 degrees or less. A fine wavy line in FIG. 5 indicates the range of the sound absorbing portion 41h. The glass contact surface 41e may be included in the range.

As shown in FIG. 3, the glass run 33 for the rear door is configured in the same manner as the glass run 23 for the front door. A front vertical glass run 33B extends downward from a boundary line L1. A front corner glass run 33D lies between the boundary line L1 and a boundary line L3. An upper glass run 33A lies between the boundary line L3 and a boundary line L4. A rear corner glass run 33E lies between the boundary line L4 and a boundary line L6. A rear vertical glass run 33C extends downward from the boundary line L6. An upper portion of the front corner glass run 33D is designated by a reference character 33F, and an upper portion of the rear corner glass run 33E is designated by a reference character 33G.

Advantages of Embodiment

Figure 6:
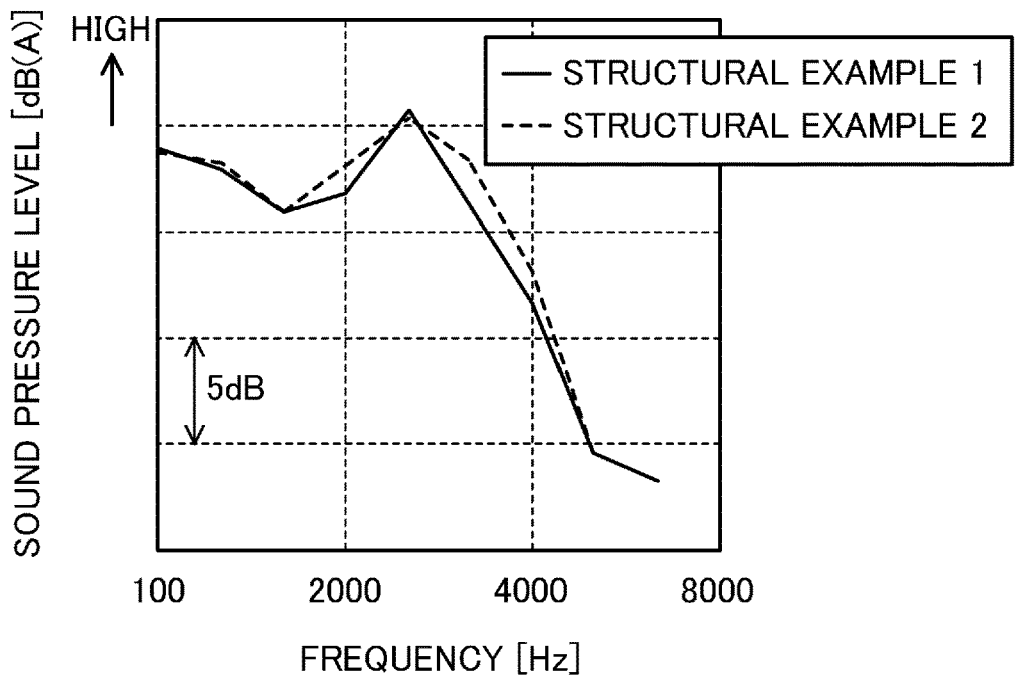
FIG. 6 is a graph illustrating the results of a test performed on a glass run with no sound absorbing portion.
Figure 8:
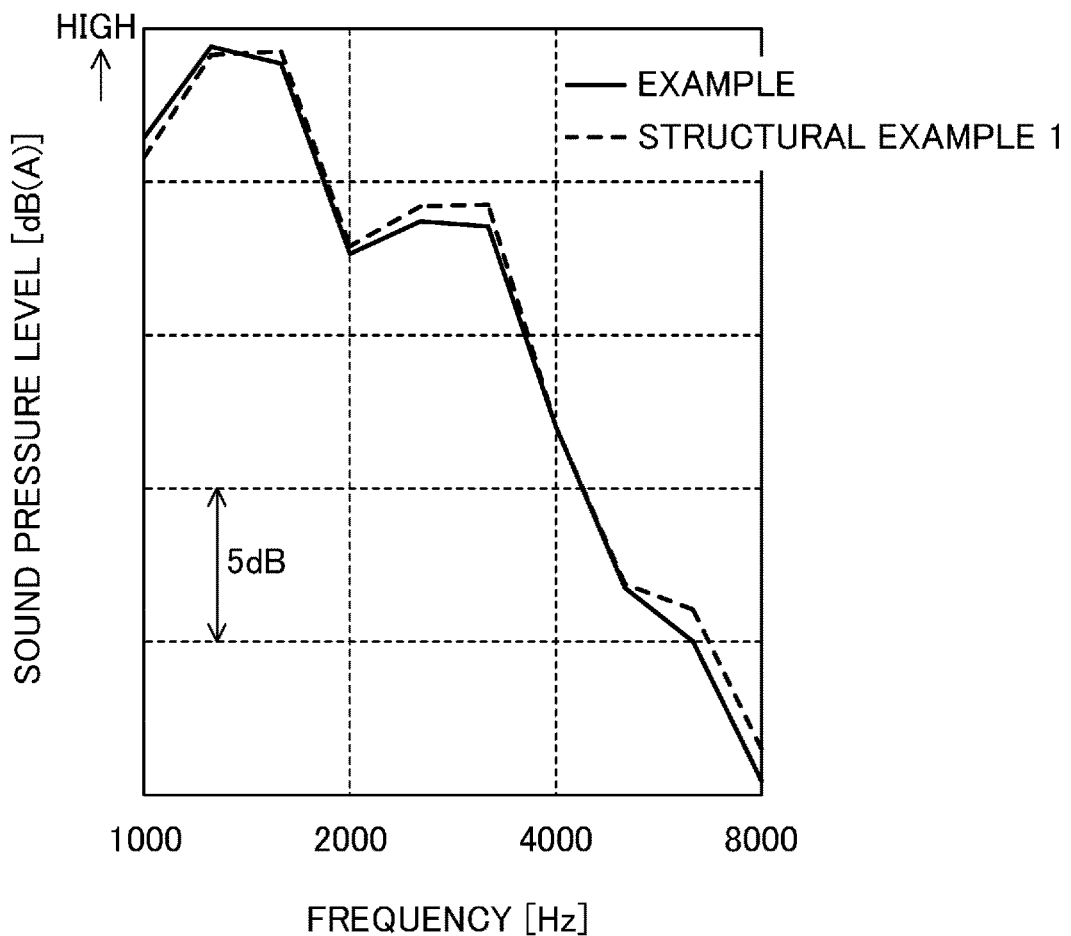
FIG. 8 is a graph illustrating the results of a test performed on a glass run provided with a sound absorbing portion.

Advantages of the first embodiment will be described below. A test was performed to demonstrate the advantages. FIGS. 6 and 8 show the results of the test. The test was carried out by generating sound from an omnidirectional speaker (not shown) placed outside the cabin of the automobile 1 with the front and rear door glasses 22 and 32 fully closed, and a sound pressure was measured using a microphone placed inside the cabin. The microphone was arranged at a level corresponding to the passenger's head.

FIG. 6 shows the measurement results. In the graph of FIG. 6, a horizontal axis represents a measuring frequency, and a vertical axis represents a sound pressure level. The larger the value on the vertical axis is, the higher the sound pressure is. In Structural Example 1, an angle α formed between the facing surface 41d of the base end portion 41b of the inner seal lip 41 and the inner surface 22b of the front door glass 22 was set to 45 degrees in the upper glass run 23A, the rear corner glass run 23E, and the rear vertical glass run 23C. In Structural Example 2, the same angle α was set to 25 degrees. In Structural Examples 1 and 2, the facing surface 41d had no sound absorbing portion 41h, and was smooth just like the glass contact surface 41e.

As apparent from the measurement results shown in FIG. 6, Structural Example 1 in which the angle α was set to 45 degrees showed a significant effect of reducing the sound pressure as compared with Structural Example 2 in which the angle α was set to 25 degrees. Specifically, in Structural Example 1, the sound pressure was reduced by about 2 to 3 dB at around 2000 Hz and in a wide range from around 3000 Hz to 5000 Hz.

The present inventors have conducted the test more elaborately by gradually changing the angle α in a range from 15 degrees to 90 degrees. As a result, the sound pressure significantly increased if the angle α was less than 35 degrees, and more than 65 degrees, as compared with the case where the angle α was 35 degrees or more and 65 degrees or less. This indicates that the angle α is suitably set to 35 degrees or more and 65 degrees or less. When the angle α was 40 degrees or more and 50 degrees or less, the results obtained were particularly suitable.

Specifically, if the angle α is set to 35 degrees or more, noise that has entered the space R between the facing surface 41d of the base end portion 41b of the inner seal lip 41 and the inner surface 22b of the front door glass 22 through the front door glass 22 is reflected fewer times in the space R, and thus, is less prone to be amplified. Moreover, the angle α formed between the facing surface 41d and the inner surface 22b of the door glass 22 is set to 65 degrees or less. This may reduce the risk of a decrease in amount of sound reflected from the base end portion 41b of the inner seal lip 41 and goes out of the cabin through the door glass 22. Consequently, the sound pressure of the noise that reaches the passenger's ears may be reduced, as clearly understood from the test results.

Further, setting the angle α to 35 degrees or more reduces an incident angle θ (shown in FIG. 4) of sound that enters the facing surface 41d from the outside of the cabin through the front door glass 22 as compared with the case where the angle α is set to, for example, 25 degrees. Thus, a sound component itself which obliquely enters the facing surface 41d decreases, and the front door glass 22 increases a transmission loss due to the so-called coincidence effect. This may also reduce the sound pressure of noise that reaches the passenger's ears. Note that the incident angle θ of the sound is formed between the direction of sound going toward the outer surface 22a of the front door glass 22 and the outer surface 22a.

From the viewpoint of the structure of the vehicle, the tip end of the door glass 22 may possibly collide against the facing surface 41d of the base end portion 41b when the door glass 22 moves upward, depending on variations in fitting accuracy of the door 2. In such a case, collision energy may be dissipated if the angle α is 45 degrees or less, which may suitably prevent breakage of the door 2.

In the alternative example shown in FIG. 5, the shape of the space R is substantially the same as that of the above-described example. Thus, the alternative example may have substantially the same advantages as Structural Example 1. Further, the glass run 33 for the rear door also has substantially the same advantages as the glass run 23 for the front door.

A graph shown in FIG. 8 represents the difference in sound pressure between the example of the present disclosure and Structural Example 1. In this graph, a horizontal axis represents a measuring frequency, and a vertical axis represents a sound pressure level. The example was obtained by forming the sound absorbing portion 41h on the facing surface 41d of Structural Example 1 in which the angle α was set to 45 degrees (see FIG. 4). As clearly understood from the measurement results shown in FIG. 8, the example showed the sound pressure reduced by about 1 dB in a wide frequency range from around 2000 Hz to around 3500 Hz as compared with Structural Example 1 having no sound absorbing portion 41h. In addition, the sound pressure was also reduced by about 1 dB in a range above 5000 Hz. This improves quietness in terms of audibility. If the angle α is in the range from 35 degrees up to and including 65 degrees, the sound absorbing portion 41h is suitably formed on the facing surface 41d. More suitably, the sound absorbing portion 41h is formed on the facing surface 41d if the angle α is in the range from 40 degrees up to and including 50 degrees.

According to the first embodiment described above, the tip end portion 41c of the inner seal lip 41 of the glass run 23 for the front door comes into contact with the inner surface 22b of the front door glass 22 to seal a gap between the front door glass 22 and the door frame 21. In this sealed state, the space R is formed between the base end portion 41b of the inner seal lip 41 and the inner surface 22b of the front door glass 22. Noise that has entered the cabin through the front door glass 22 includes a component which may pass through the space R and reach the facing surface 41d of the inner seal lip 41 facing the inner surface 22b of the front door glass 22. The facing surface 41d is provided with the sound absorbing portion 41h, which absorbs the noise component that has reached the facing surface 41d. As a result, reflection amplification of the noise does not occur easily in the space R.

Further, the angle formed between the facing surface 41d of the inner seal lip 41 and the inner surface 22b of the front door glass 22 is 35 degrees or more. Thus, noise that has entered the space R through the front door glass 22 is reflected fewer times in the space R, and thus, is less prone to be amplified as shown in FIG. 6. Moreover, the angle formed between the facing surface 41d and the inner surface 22b of the front door glass 22 is 65 degrees or less. This may reduce the risk of a decrease in amount of sound reflected from the base end portion 41b of the inner seal lip 41 and goes out of the cabin through the door glass 22. That is, setting of the angle α in the above-described manner and provision of the sound absorbing portion 41h synergistically reduce the noise, thereby further reducing the sound pressure of noise that reaches the passenger's ears.

In addition, since the angle formed between the facing surface 41d and the inner surface 22b of the front door glass 22 is 35 degrees or more, a sound component itself which obliquely passes through the front door glass 22 to enter the facing surface 41d decreases, and the front door glass 22 increases a transmission loss due to the so-called coincidence effect. This may also reduce the sound pressure of the noise that reaches the passenger's ears. Thus, such a simple configuration may reduce the sound pressure of noise that reaches the passenger's ears, while reducing an increase in the weight and cost of the glass run.

Also in the example shown in FIG. 5, the curved surface 41g of the inner seal lip 41 and the sound absorbing portion 41h provide the same synergistic advantages.

Moreover, the sound absorbing portion 41h of the inner seal lip 41 is not formed on the glass contact surface 41e of the inner seal lip 41. This may prevent damage and/or wear of the sound absorbing portion 41h caused by the front door glass 22 if the front door glass 22 slides on the sound absorbing portion 41h. Consequently, the sound absorbing portion 41h is allowed to absorb sound effectively for a long time. If the sound absorbing portion 41h is comprised of a rough surface or a bristled portion, the front door glass 22 does not slide on the rough surface or the bristled portion. This may reduce the generation of noise.

Besides, since the upper glass run 23A and the portions 23F, 23G of the corner glass runs are located at a level closer to the passenger's ears seated in the cabin, the upper glass run 23A and the corner glass runs 23D, 23E greatly contribute to the noise reduction. Thus, the effect of noise reduction may be more remarkable if the angle α formed between the facing surface 41d of the base end portion 41b of the inner seal lip 41 and the inner surface 22b of the front door glass 22 is set in the above-described manner in the upper glass run 23A and the portions 23F, 23G of the corner glass runs.

Note that the rear door 3 may also have the same advantages as the front door 2. Thus, improved quietness is achieved also in the rear seats.

Second Embodiment

Figure 10:
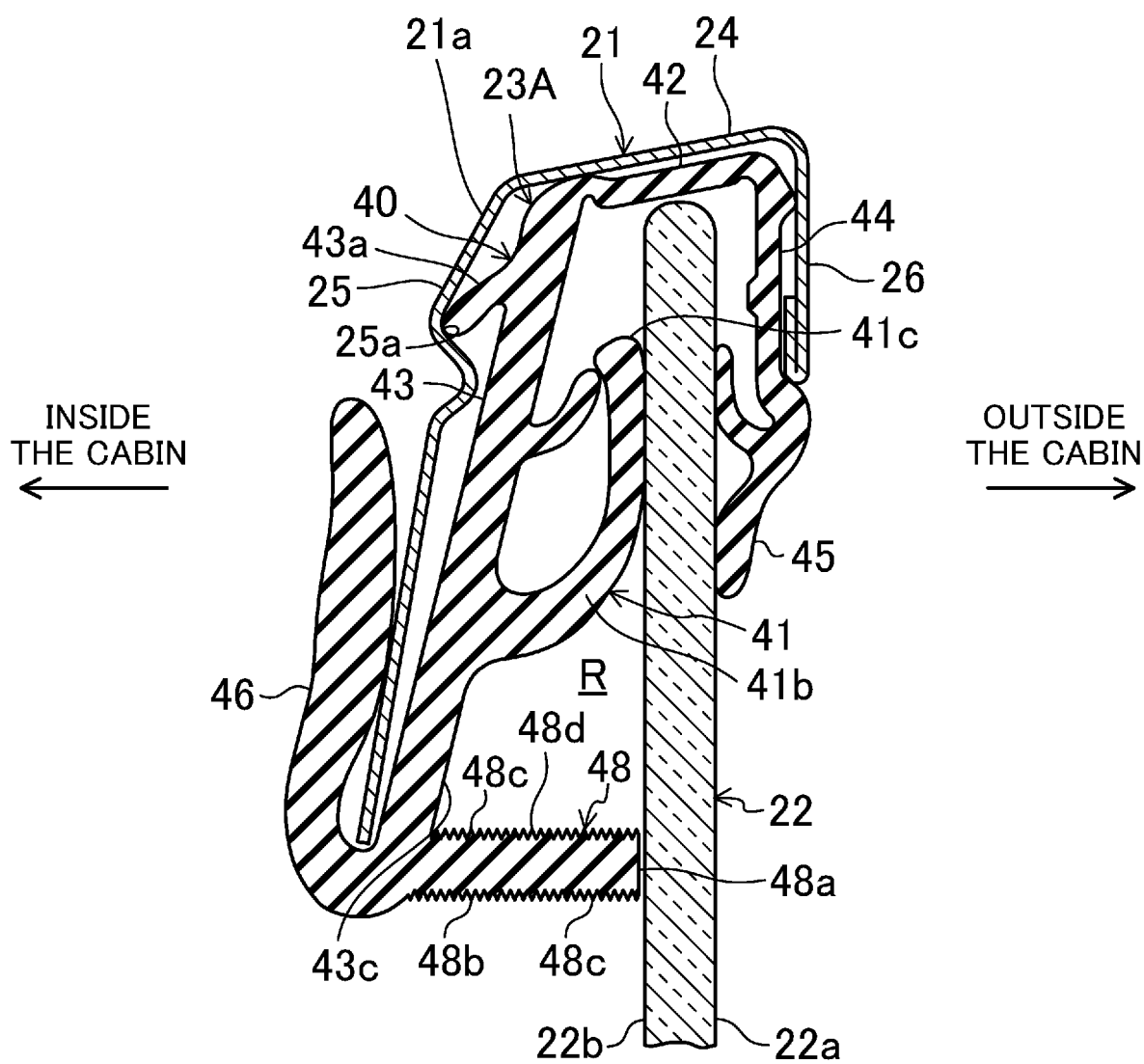
FIG. 10 is a view corresponding to FIG. 4, illustrating a second embodiment.

FIG. 10 shows a configuration for a door frame 21 and a glass run 23 for a front door according to a second embodiment of the present disclosure. The second embodiment is the same as the first embodiment except for the cross-sectional shape of the door frame 21 and the configuration of the glass run 23. Thus, the same components as those of the first embodiment are designated by the same reference characters, and description thereof will not be repeated again. The difference between the first and second embodiments will be described in detail below.

An upper frame portion 21a of the door frame 21 includes a bottom portion 24, an inner side portion 25, and an outer side portion 26. An upper glass run 23A includes a glass run body 40, an inner seal lip 41, an outer seal lip 45, a design lip 46, and a sound barrier 48. The glass run body 40 includes a bottom wall portion 42, an inner wall portion 43, and an outer wall portion 44.

The outer seal lip 45 is provided at an end of the outer wall portion 44. The outer seal lip 45 has branches respectively extending upward and downward from the end of the outer wall portion 44. However, the outer seal lip 45 may extend in the upward direction only.

The inner seal lip 41 is integrally molded with, and located in a middle portion of, the inner wall portion 43. The inner seal lip 41 extends toward an inner surface 22b (a surface facing the inside of the cabin) of a front door glass 22, and includes a tip end portion 41c configured to come into contact with the inner surface 22b of the front door glass 22. A space R is formed between a base end portion 41b of the inner seal lip 41 and the inner surface 22b of the front door glass 22.

The design lip 46 is integrally molded with an end of the inner wall portion 43. The design lip 46 covers an inner surface (a surface facing the inside of the cabin) of the inner side portion 25 of the upper frame portion 21a.

The sound barrier 48 is provided at an end of the inner wall portion 43, which is an inner portion located inside of the cabin, of the glass run body 40, and protrudes from the inner wall portion 43 toward the inner surface 22b of the front door glass 22. The sound barrier 48 covers the space R. The sound barrier 48 is arranged to face the base end portion 41b of the inner seal lip 41. A predetermined gap is provided between an outer end face 48a (an end face facing the outside of the cabin) of the sound barrier 48 and the inner surface 22b of the front door glass 22, such that the sound barrier 48 does not come into contact with the inner surface 22b of the front door glass 22 moving up or down. The gap may be set to 1 mm or less.

The sound barrier 48 includes an outer surface 48b facing the cabin, and an inner surface 48d facing the space R. The outer surface 48b of the sound barrier 48 includes a sound absorbing portion 48c (indicated by a fine wavy line) similar to the sound absorbing portion 41h of the first embodiment. The inner surface 48d is also provided with the same sound absorbing portion 48c, which may be omitted. In this embodiment, the sound absorbing portion 48c is formed on the outer and inner surfaces 48b and 48d of the sound barrier 48, but this is merely a non-limiting example. Although not shown, the sound absorbing portion 48c may be formed on the end face 48a of the sound barrier 48. Further, although not shown, the sound absorbing portion may be formed on the base end portion 41b of the inner seal lip 41. In addition, although not shown, the sound absorbing portion may be formed between the inner surface 48d of the sound barrier 48 and the base end portion 41b of the inner seal lip 41 (a portion indicated by a reference character 43c in FIG. 10).

According to the second embodiment, the sound barrier 48 covers the space R between the base end portion 41b of the inner seal lip 41 and the inner surface 22b of the front door glass 22, which may block noise that has entered the space R through the front door glass 22 from easily reaching the passenger. In addition, the noise that has entered the space R is absorbed by the sound absorbing portion 48c formed on the inner surface 48d of the sound barrier 48.

Moreover, the noise that has entered the cabin through the front door glass 22 includes a component that may reach the outer surface 48b of the sound barrier 48. However, the outer surface 48b is provided with the sound absorbing portion 48c, which absorbs the noise that has reached the sound barrier 48. Thus, such a simple configuration may reduce the sound pressure of noise that reaches the passenger's ears, while reducing an increase in the weight and cost of the glass run.

Figure 11:
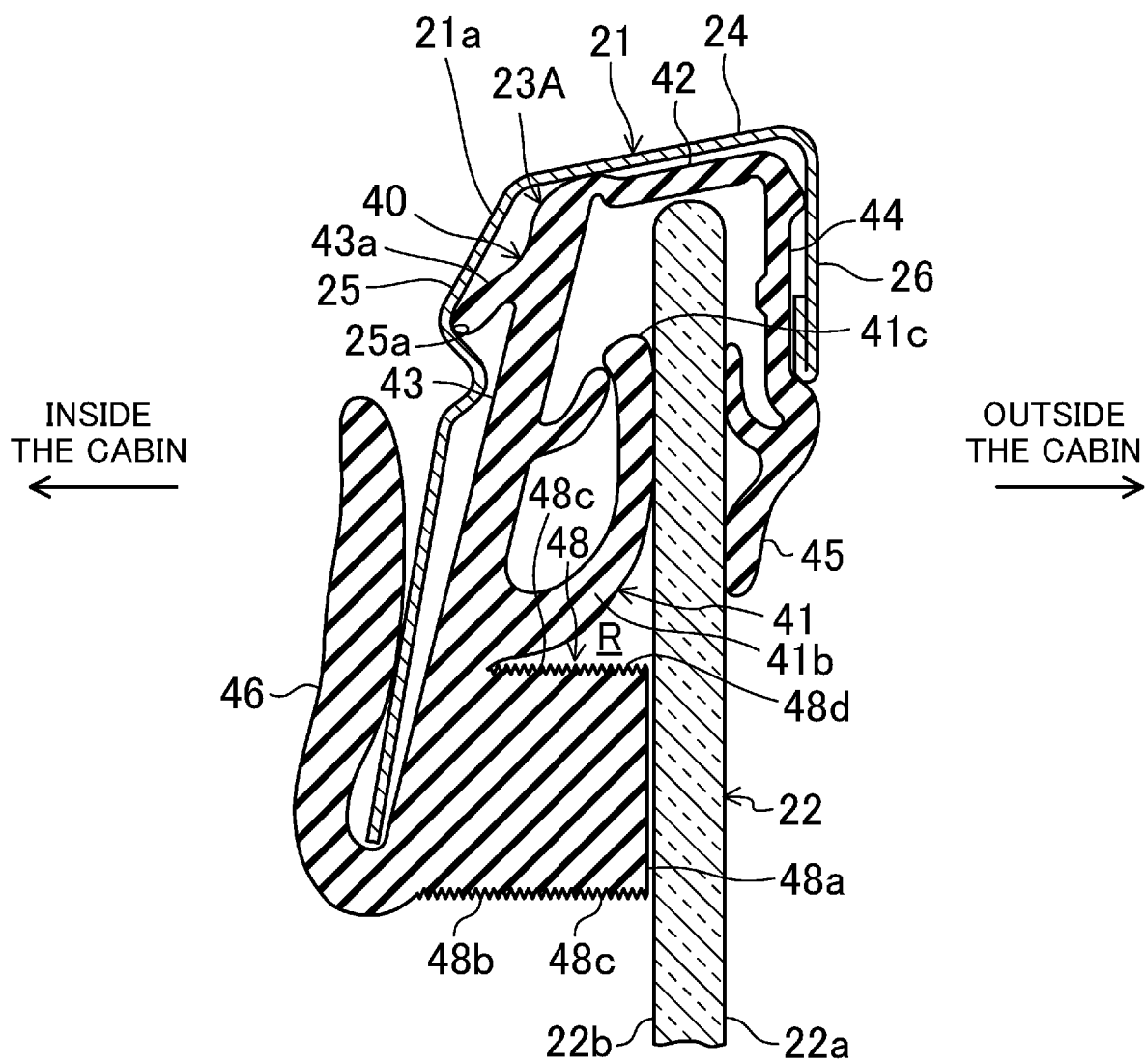
FIG. 11 is a view corresponding to FIG. 4, illustrating a first alternative example of the second embodiment.

Alternatively, as a first alternative example of the second embodiment shown in FIG. 11, the sound barrier 48 may be thickened. In the first alternative example, the inner surface 48d of the sound barrier 48 is located closer to the base end portion 41b of the inner seal lip 41, thereby narrowing the space R. This may further reduce reflection amplification of the noise that has entered the space R. The sound absorbing portion 48c on the inner surface 48d may be omitted.

Figure 12:
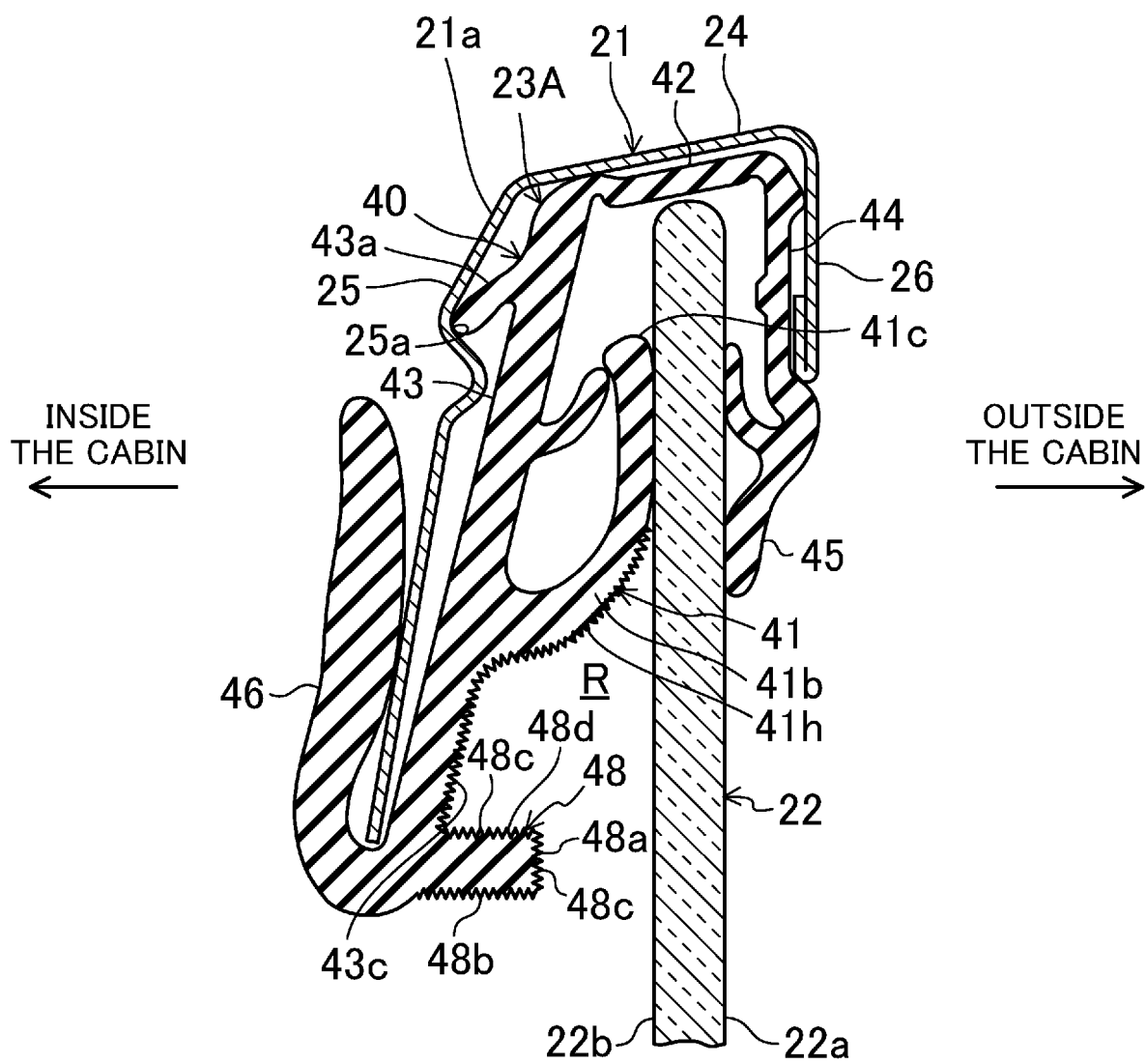
FIG. 12 is a view corresponding to FIG. 4, illustrating a second alternative example of the second embodiment.

Further, as a second alternative example of the second embodiment shown in FIG. 12, the dimension of the sound barrier 48 protruding from the inner wall portion 43 may be reduced. In this second alternative example, the sound absorbing portion 48c, which is also formed on the end face 48a of the sound barrier 48, may be omitted. In addition, the sound absorbing portion 41h according to the first embodiment is also provided on the base end portion 41b of the inner seal lip 41, and a portion between the inner surface 48d of the sound barrier 48 and the base end portion 41b of the inner seal lip 41 (a portion indicated by a reference numeral 43c in FIG. 12). According to this second alternative example, the sound absorbing portion 41h is formed also on the base end portion 41b of the inner seal lip 41, and the portion 43c between the inner surface 48d of the sound barrier 48 and the base end portion 41b of the inner seal lip 41. Thus, the sound pressure of noise that reaches the passenger's ears may further be reduced. The sound absorbing portion 41h can be omitted.

Figure 13:
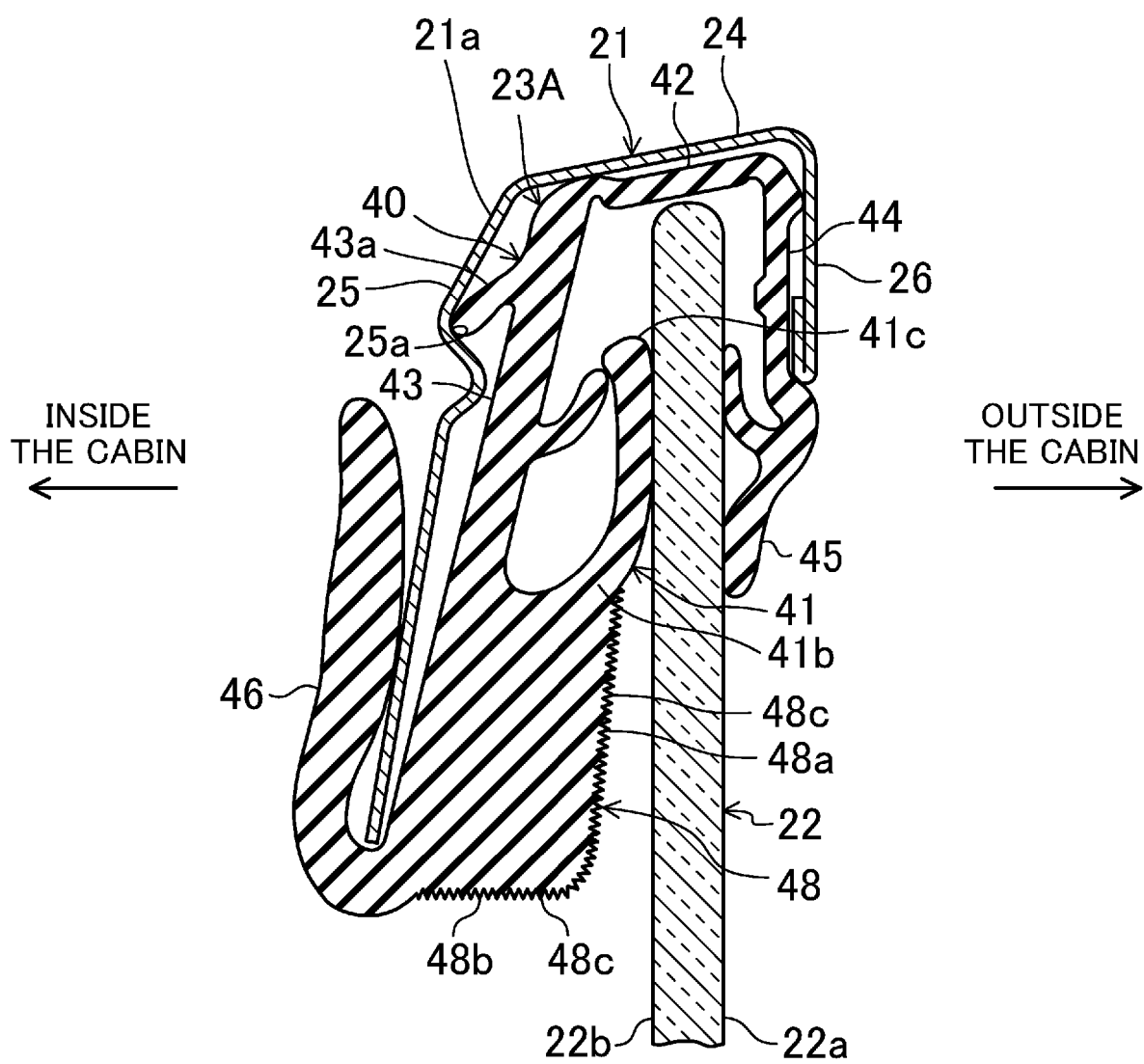
FIG. 13 is a view corresponding to FIG. 4, illustrating a third alternative example of the second embodiment.

Moreover, as a third alternative example of the second embodiment shown in FIG. 13, the sound barrier 48 may be formed integrally with the base end portion 41b of the inner seal lip 41. In the third alternative example, the sound barrier 48 is thickened to be an integral part of the base end portion 41b of the inner seal lip 41. Thus, no space is formed between the base end portion 41b of the inner seal lip 41 and the inner surface 22b of the front door glass 22. In the third alternative example, the sound absorbing portion 48c, which is formed on the end face 48a of the sound barrier 48, may be omitted.

The sound barrier 48, integrated with the base end portion 41b of the inner seal lip 41, may reduce the possibility that dust or any other substance remains between the sound barrier 48 and the base end portion 41b of the inner seal lip 41, and make a ridge of the sound barrier 48 invisible from outside through the outer surface 22a of the front door glass 22, thereby enhancing the appearance of the vehicle.

Figure 14:
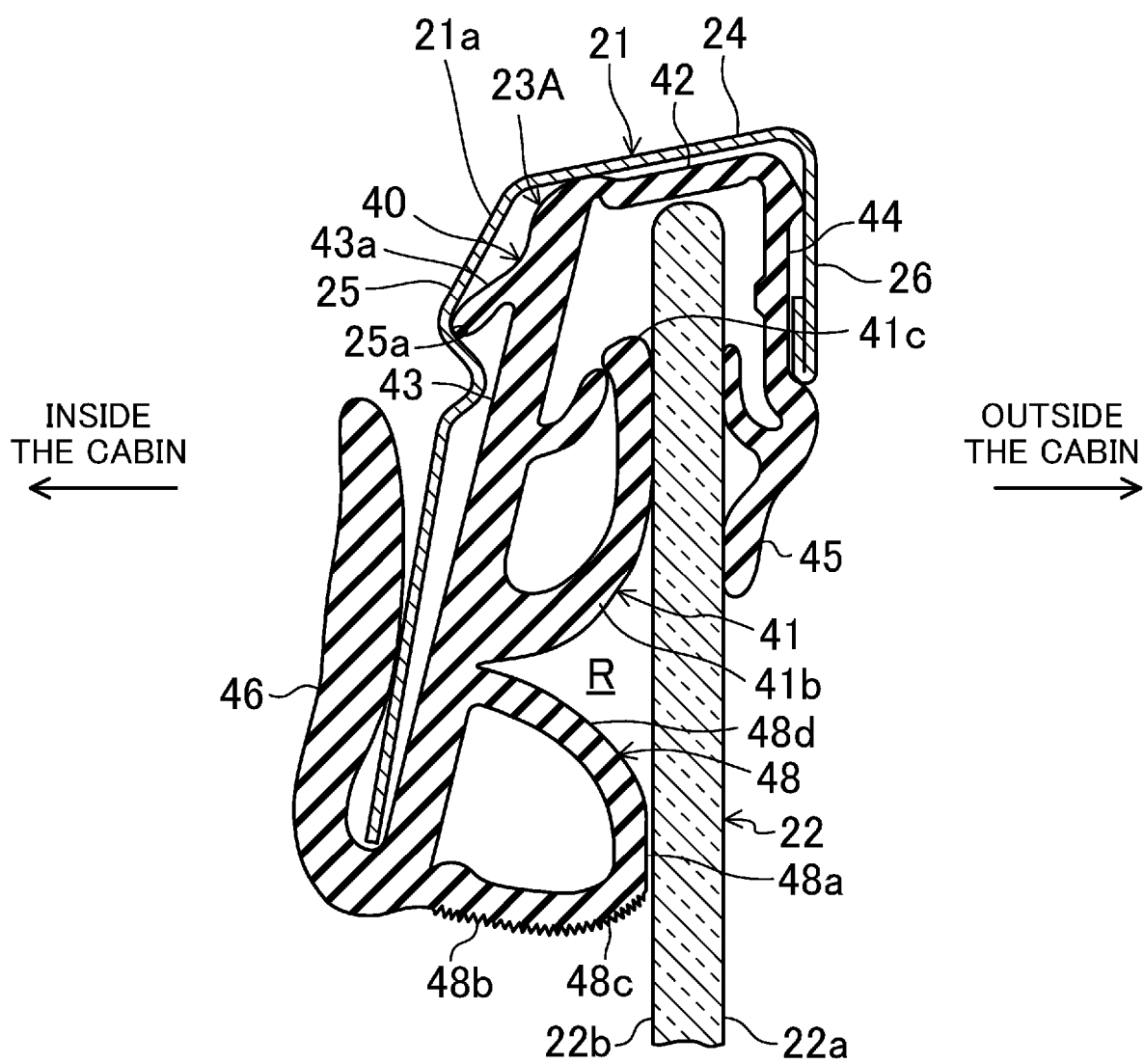
FIG. 14 is a view corresponding to FIG. 4, illustrating a fourth alternative example of the second embodiment.

Besides, as a fourth alternative example of the second embodiment shown in FIG. 14, the sound barrier 48 may have a hollow portion inside. The sound absorbing portion 48c is formed on the outer surface 48b of the sound barrier 48. The sound absorbing portion may also be formed on the end face 48a and inner surface 48d of the sound barrier 48. The hollow sound barrier 48 may contribute to reduction of weight.

In the example shown in FIG. 10 in which the sound barrier 48 is not thick, the sound barrier 48 may possibly be warped and turned over while the door glass 22 is assembled or closed. If the sound barrier 48 is turned over, the gap between the end face 48a of the sound barrier 48 and the door glass 22 may increase, thereby raising the sound pressure level due to reverberations. However, if the hollow sound barrier 48 as shown in FIG. 14 is adopted, the risk of increase in the gap and the sound pressure level may be reduced.

Third Embodiment

Figure 15:
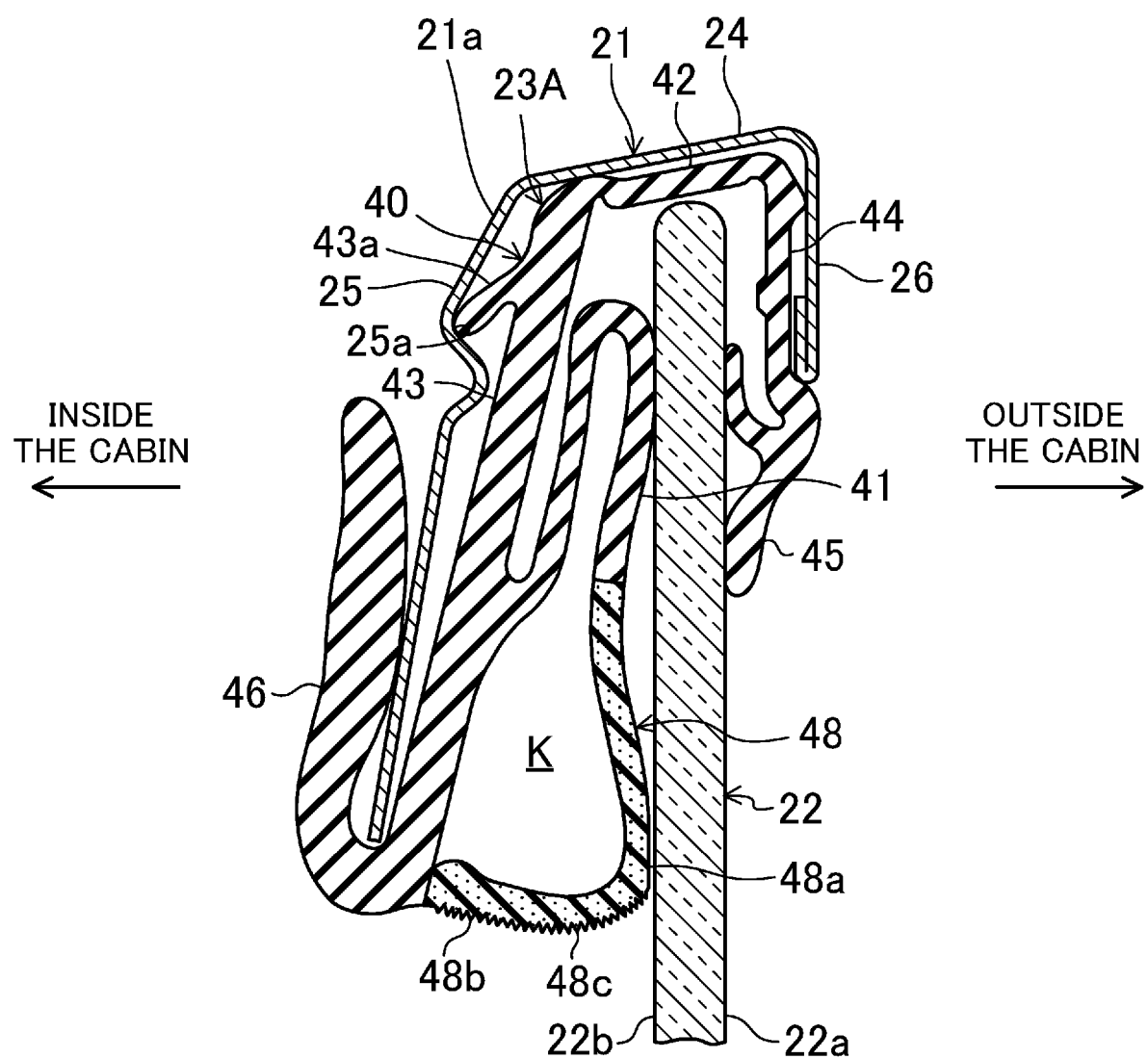
FIG. 15 is a view corresponding to FIG. 4, illustrating a third embodiment.

FIG. 15 illustrates a configuration for a door frame 21 and a glass run 23 for a front door according to a third embodiment of the present disclosure. The third embodiment is the same as the first embodiment except for the cross-sectional shape of the door frame 21 and the configuration of the glass run 23. Thus, the same components as those of the first embodiment are designated by the same reference characters, and description thereof will not be repeated again. The difference between the first and third embodiments will be described in detail below.

An upper glass run 23A includes a glass run body 40, an inner seal lip 41, an outer seal lip 45, a design lip 46, and a sound barrier 48. The glass run body 40 includes a bottom wall portion 42, an inner wall portion 43, and an outer wall portion 44.

The outer seal lip 45 is provided at an end of the outer wall portion 44. The outer seal lip 45 has branches respectively extending upward and downward from the end of the outer wall portion 44.

The inner seal lip 41 is integrally molded with, and located in a middle portion of, the inner wall portion 43. The inner seal lip 41 extends upward, and is bent downward so as to come into contact with the inner surface 22b of the front door glass 22.

The design lip 46 is integrally molded with an end of the inner wall portion 43. The design lip 46 covers an inner surface (a surface facing the inside of the cabin) of the inner side portion 25 of the upper frame portion 21a.

The sound barrier 48 extends from an end of the inner wall portion 43, which is an inner portion located inside of the cabin, of the glass run body 40 toward the inner surface 22b of the front door glass 22, and then extends upward. An upper end of the sound barrier 48 is continuous with an end of the inner seal lip 41. The sound barrier 48, the inner seal lip 41, and the inner wall portion 43 form a hollow portion K having a closed cross section.

A predetermined gap is provided between an end face 48a (an end face facing the outside of the cabin) of the sound barrier 48 and the inner surface 22b of the front door glass 22, such that the sound barrier 48 does not come into contact with the inner surface 22b of the front door glass 22 moving up or down.

The sound barrier 48 includes an outer surface 48b facing the cabin. The outer surface 48b of the sound barrier 48 is provided with a sound absorbing portion 48c similar to the sound absorbing portion 41h of the first embodiment. In this embodiment, the sound absorbing portion 48c is formed on the outer surface 48b of the sound barrier 48, but this is merely a non-limiting example. Although not shown, the sound absorbing portion 48c may be formed on the end face 48a of the sound barrier 48. Further, although not shown, the sound absorbing portion may be formed on the inner seal lip 41. In this embodiment, the sound barrier 48 is made of a foamed material. However, the sound barrier 48 may be made of a solid material.

According to the third embodiment, the sound absorbing portion 48c of the sound barrier 48 absorbs noise that has entered the cabin. Thus, such a simple configuration may reduce the sound pressure of noise that reaches the passenger's ears, while reducing an increase in the weight and cost of the glass run.

Figure 16:
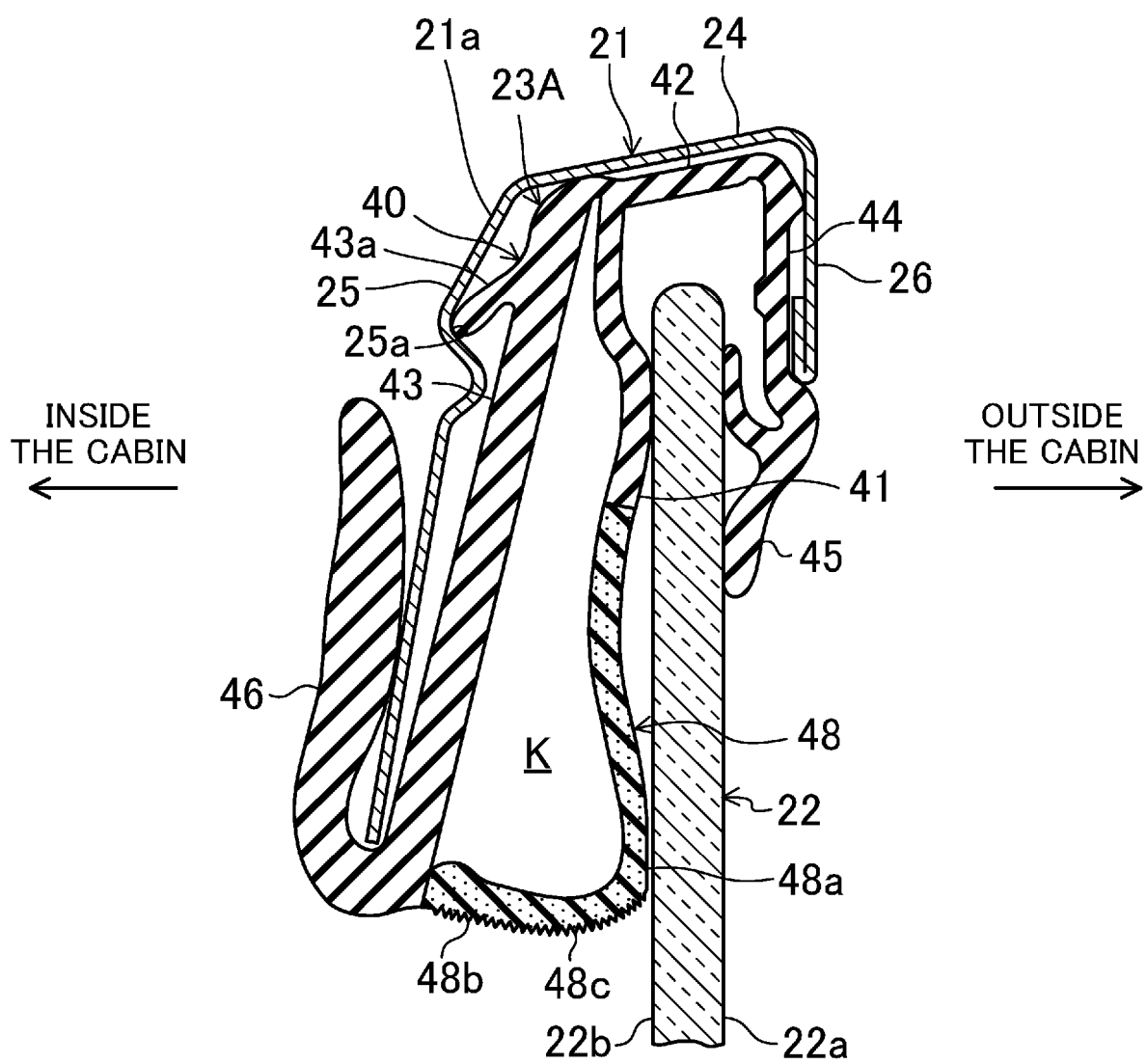
FIG. 16 is a view corresponding to FIG. 4, illustrating a first alternative example of the third embodiment.

As a first alternative example of the third embodiment shown in FIG. 16, the inner seal lip 41 may extend from the bottom wall portion 42 of the glass run body 40. In this first alternative example, the inner seal lip 41 extends downward from the bottom wall portion 42, and the end of the sound barrier 48 is continuous with an end of the inner seal lip 41.

Figure 17:
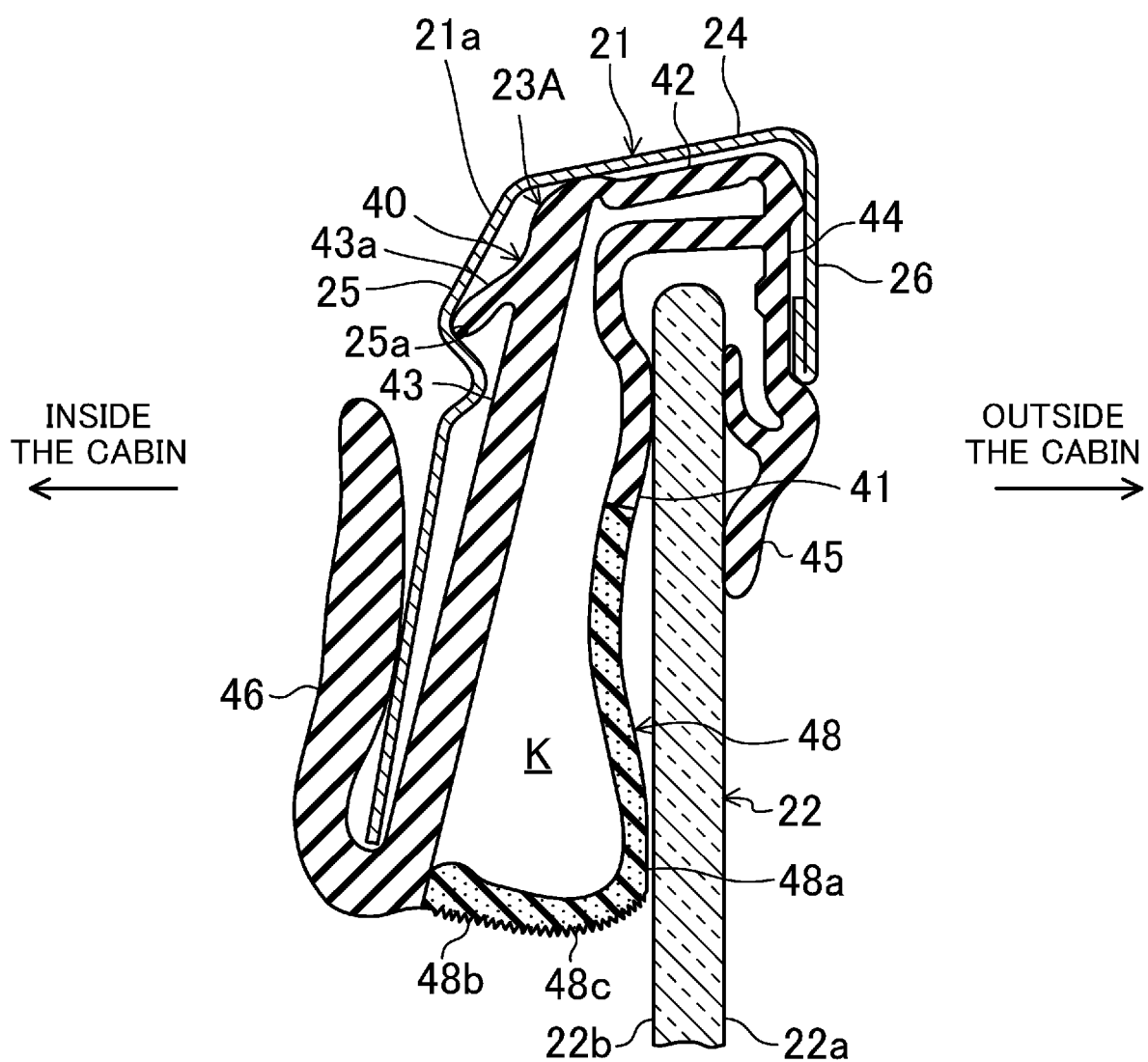
FIG. 17 is a view corresponding to FIG. 4, illustrating a second alternative example of the third embodiment.

Further, as a second alternative example of the third embodiment shown in FIG. 17, the inner seal lip 41 may extend from the outer wall portion 44 of the glass run body 40. In the second alternative example, the inner seal lip 41 extends toward the inside of the cabin from an upper portion of the outer wall portion 44, and then extends downward. The end of the sound barrier 48 is continuous with an end of the inner seal lip 41.

Figure 18:
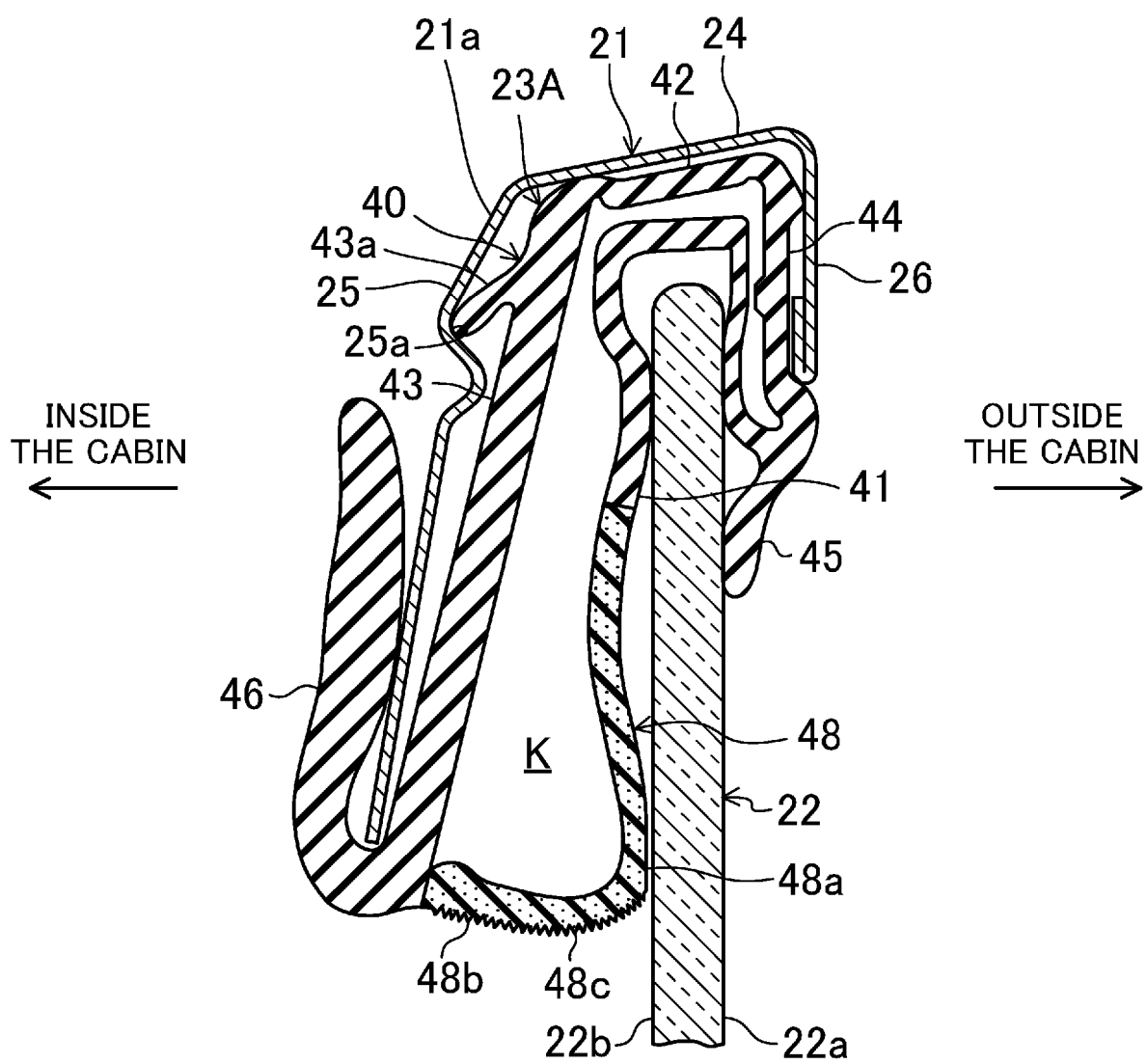
FIG. 18 is a view corresponding to FIG. 4, illustrating a third alternative example of the third embodiment.

Moreover, as a third alternative example of the third embodiment shown in FIG. 18, the inner seal lip 41 may extend from the outer seal lip 45 of the glass run body 40. In the third alternative example, the inner seal lip 41 extends upward from an upper portion of the outer seal lip 45, extends toward the inside of the cabin, and then extends downward. The end of the sound barrier 48 is continuous with an end of the inner seal lip 41.

Fourth Embodiment

Figure 19:
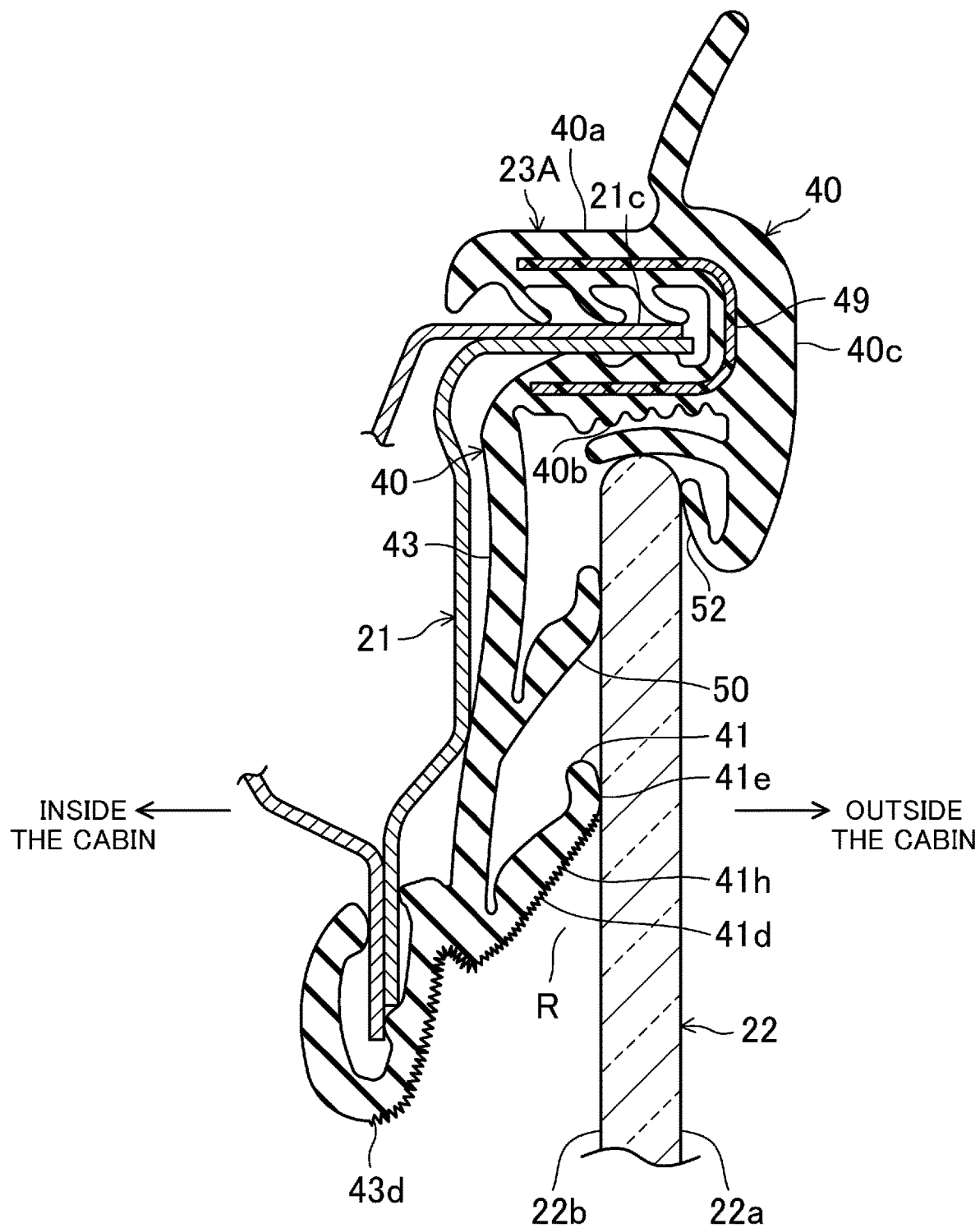
FIG. 19 is a view corresponding to FIG. 4, illustrating a fourth embodiment.

FIG. 19 illustrates a configuration for a door frame 21 and a glass run 23 for a front door according to a fourth embodiment of the present disclosure. According to the fourth embodiment, the door frame 21 is provided with a flange 21c protruding toward the outside of the cabin, and the glass run 23 is attached to cover the flange 21c from the outside of the cabin. In the following description, the same components as those of the first embodiment are designated by the same reference characters, and description thereof will not be repeated again. The difference between the first and fourth embodiments will be described in detail below.

A glass run body 40 of the glass run 23 includes an upper wall portion 40a located above the flange 21c of the door frame 21, a lower wall portion 40b located under the flange 21c of the door frame 21, and an outer wall portion 40c extending from an outer end (an end located outside the cabin) of the upper wall portion 40a to an outer end (an end located outside the cabin) of the lower wall portion 40b. The glass run body 40 is open toward the inside of the cabin. The flange 21c of the door frame 21 is inserted in the open portion of the glass run body 40, such that the glass run body 40 is assembled to the door frame 21. A core 49 made of a rigid resin material or a metallic material is embedded in the upper wall portion 40a, lower wall portion 40b, and outer wall portion 40c of the glass run body 40.

An inner end (an end located inside the cabin) of the lower wall portion 40b of the glass run body 40 is continuous with an upper end of the inner wall portion 43. The inner wall portion 43 extends downward from the inner end of the lower wall portion 40b. A bent portion 43d which is bent upward is formed at a lower end of the inner wall portion 43. The bent portion 43d covers a lower end of the door frame 21.

At the lower end of the inner wall portion 43, the inner seal lip 41 which comes into contact with the inner surface 22b of the front door glass 22 is provided. A sound absorbing portion 41h is provided in a region from the inner seal lip 41 to the bent portion 43d. Further, an intermediate seal lip 50 which comes into contact with the inner surface 22b of the front door glass 22 is provided at a vertical middle portion of the inner wall portion 43. Although not shown, the intermediate seal lip 50 may be provided with a sound absorbing portion.

A lower end of the outer wall portion 40c of the glass run body 40 extends to a level lower than the lower wall portion 40b. An outer seal lip 52 (located outside the cabin) which comes into contact with the outer surface 22a of the front door glass 22 is provided at the lower end of the outer wall portion 40c.

According to the fourth embodiment, just like the first embodiment, noise that has entered the cabin through the front door glass 22 passes through the space R, reaches the region ranging from the facing surface 41d of the inner seal lip 41 facing the inner surface 22b of the front door glass 22 to the bent portion 43d, and is absorbed by the sound absorbing portion 41h. As a result, reflection amplification of the noise does not occur easily in the space R. In addition, the sound pressure of noise that reaches the passenger's ears may further be reduced.

Embodiments have just been described as examples of the technique disclosed in the present application. However, the present disclosure is not limited to those exemplary embodiments. Any variations or modifications falling within the range of equivalents to the claims to be described below are all encompassed within the scope of the present invention.

The glass run for an automobile door according to the present disclosure is applicable to, for example, a door provided on a side of an automobile.

What is claimed is:

1. A glass run for an automobile door, the glass run being attached to a door frame extending along an edge of a door glass, and made of an elastic material which seals a gap between the door glass and the door frame, wherein
   the glass run comprises a glass run body attached to the door flame, and an inner seal lip extending from an inner portion of the glass run body located inside a cabin toward an inner surface of the door glass facing inside the cabin, and including a tip end portion configured to come into contact with the inner surface of the door glass,
   the inner seal lip includes a base end portion separated from the inner surface of the door glass toward the inside of the cabin, the base end portion of the inner seal lip and the inner surface of the door glass forming a gap therebetween,
   a facing surface of the inner seal lip facing the inner surface of the door glass is provided with a sound absorbing portion which absorbs noise that has entered the cabin through the door glass, wherein:
   the sound absorbing portion includes a plurality of protrusions protruding from the facing surface toward the inner surface of the door glass facing inside the cabin, the plurality of protrusions being arranged on the facing surface,
   the inner seal lip includes a glass contact surface on which the door glass slides when moving up or down, and
   the sound absorbing portion is not formed on the glass contact surface.

2. The glass run of claim 1, wherein
   an angle formed between the facing surface of the inner seal lip and the inner surface of the door glass is set to 35 degrees or more and 65 degrees or less.

3. The glass run of claim 1, wherein each of the plurality of protrusions have a base portion proximal the facing surface and a tip end distal the facing surface, and each of the plurality of protrusions extend from the base portion toward the tip end in a protruding direction toward the gap.

* * * * *